US 9,409,542 B2

(12) United States Patent
Fujiwara

(10) Patent No.: US 9,409,542 B2
(45) Date of Patent: Aug. 9, 2016

(54) VEHICLE SIDE AIRBAG DEVICE AND MANUFACTURING METHOD OF SIDE AIRBAG

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/884,002

(22) Filed: Oct. 15, 2015

(65) Prior Publication Data

US 2016/0114757 A1 Apr. 28, 2016

(30) Foreign Application Priority Data

Oct. 27, 2014 (JP) ................. 2014-218639

(51) Int. Cl.
*B60R 21/207* (2006.01)
*B60R 21/233* (2006.01)
*B60R 21/231* (2011.01)
*B60R 21/2338* (2011.01)
*B60R 21/235* (2006.01)
*D05B 1/04* (2006.01)
(Continued)

(52) U.S. Cl.
CPC ......... *B60R 21/23138* (2013.01); *B60R 21/207* (2013.01); *B60R 21/233* (2013.01); *B60R 21/235* (2013.01); *B60R 21/2338* (2013.01); *D05B 1/04* (2013.01); *D05B 1/26* (2013.01); *D05B 13/00* (2013.01); *B60R 2021/23146* (2013.01); *B60R 2021/23324* (2013.01); *B60R 2021/23382* (2013.01); *B60R 2021/23576* (2013.01)

(58) Field of Classification Search
CPC ............ B60R 21/23138; B60R 21/235; B60R 21/233; B60R 21/207; B60R 21/2338; B60R 2021/23324; B60R 2021/23382; B60R 2021/23576; B60R 2021/23146; D05B 1/26; D05B 1/04; D05B 13/00
See application file for complete search history.

(56) References Cited

U.S. PATENT DOCUMENTS 8,757,657 B1 * 6/2014 Hotta .................... B60R 21/233
280/730.2
8,915,519 B2 * 12/2014 Hotta .................. B60R 21/2346
280/729

(Continued)

FOREIGN PATENT DOCUMENTS

CA 2886916 A1 4/2015
JP 2012-025182 A 2/2012
(Continued)

Primary Examiner — Drew Brown
(74) Attorney, Agent, or Firm — Oliff PLC

(57) ABSTRACT

The present disclosure provides a vehicle side airbag device including: a side airbag, housed inside a side support section of a vehicle seat, that inflates and deploys toward a vehicle front side upon being supplied with gas from an inflator, the side airbag including: a bag body that is formed in a bag shape; a front-rear left-right partitioning cloth that partitions the bag body into a front bag section and a rear bag section, and that partitions the rear bag section into a left and a right chamber in a row along a vehicle width direction in an inflated and deployed state of the bag body; and a tether, provided at at least one chamber of the left or the right chamber, that bears tension in the inflated and deployed state, and that restricts inflation of the at least one chamber toward the vehicle front side.

15 Claims, 19 Drawing Sheets

(51) Int. Cl.
*D05B 1/26* (2006.01)
*D05B 13/00* (2006.01)

(56) References Cited

U.S. PATENT DOCUMENTS

| | | | |
|---|---|---|---|
| 2006/0001244 A1* | 1/2006 | Taguchi | B60R 21/23138 280/729 |
| 2009/0212539 A1* | 8/2009 | Honda | B60R 21/2171 280/729 |
| 2011/0285119 A1* | 11/2011 | Yamamoto | B60R 21/23138 280/743.2 |
| 2012/0049494 A1* | 3/2012 | Yamamoto | B60R 21/23138 280/730.2 |
| 2015/0021887 A1* | 1/2015 | Hiraiwa | B60R 21/233 280/729 |
| 2015/0274117 A1* | 10/2015 | Iida | B60R 21/23138 280/729 |
| 2016/0075303 A1* | 3/2016 | Iida | B60R 21/23138 280/729 |

FOREIGN PATENT DOCUMENTS

| | | |
|---|---|---|
| JP | 2015-030322 A | 2/2015 |
| WO | 2015/045613 A1 | 4/2015 |

* cited by examiner

VEHICLE SIDE AIRBAG DEVICE AND MANUFACTURING METHOD OF SIDE AIRBAG

CROSS-REFERENCE TO RELATED APPLICATION

This application claims priority under 35 USC 119 from Japanese Patent Application No. 2014-218639, filed on Oct. 27, 2014, the disclosure of which is incorporated by reference herein.

BACKGROUND

1. Technical Field

The present disclosure relates to a vehicle side airbag device and a manufacturing method of a side airbag.

2. Related Art

In a side airbag device described in Japanese Patent Application Laid-Open (JP-A) No. 2012-025182, a side airbag is sectioned into a first inflation section (rear bag section) and a second inflation section (front bag section) by a partitioning wall (front-rear partitioning section) provided at a position of the rib bones of an occupant in a suitable position. An inflator is provided inside the first inflation section, and gas generated by the inflator is supplied into the front bag section through a communication hole formed at the front-rear partitioning section. In the above case, by setting the rear bag section with a higher pressure than the front bag section, initial stave restraint performance with respect to an occupant in a suitable position may be secured, and affects to an occupant. may be suppressed even in a case in which the occupant is positioned in an unsuitable position (out of position).

However, in the above described side airbag device, in an inflated and deployed state of the side airbag, the rear hag section with high pressure projects out further toward the vehicle front side than a front edge portion of a side support section of a seatback. Accordingly, there is a possibility that the rear bag section affects an occupant in an unsuitable position.

SUMMARY OF THE INVENTION

The present disclosure provides a vehicle side airbag device and a manufacturing method of a side airbag that may suppress or prevent an occupant in an unsuitable position from being affected by a rear bag section.

A vehicle side airbag device according to a first aspect includes: a side airbag, housed inside a side support section of a seatback of a vehicle seat, that inflates and deploys toward a vehicle front side of the side support section upon being supplied with gas from an inflator, the side airbag, including: a bag body that is formed in a bag shape; a front-rear left-right partitioning cloth that partitions the hag body into a front bag section and a rear bag section, and that partitions the rear bag section into a left chamber and a right chamber in a row along a vehicle width direction in an inflated and deployed state of the bag body and a tether, provided at at least one chamber of the left chamber or the right chamber, that bears tension in the inflated and deployed state, and that restricts inflation of the at least one chamber toward the vehicle front side.

In the first aspect, gas generated by the inflator is supplied inside the bag body due to operation of the inflator, and the bag body inflates and deploys toward the vehicle front side of the side support section of the seatback. The bag body is partitioned into the front bag section and the rear bag section by the front-rear left-right partitioning cloth. The front-rear left-right partitioning cloth also partitions the rear bag section into left and right chambers, and the left and right chambers are in a row along the vehicle width direction in the inflated and deployed state of the bag body. Accordingly, the first aspect enables an inflation thickness of the rear bag section in the vehicle front-rear direction to he made smaller than an inflation thickness of the rear bag section in the vehicle width direction. Moreover, in the inflated and deployed state of the bag body, the tether provided to the at least one chamber out of the left and right chambers bears tension, such that inflation of the at least one chamber toward the vehicle front side is restricted. Due thereto, a projection amount of the left and right chambers from the side support section toward the vehicle front side are adjusted. Accordingly, the first aspect may suppress or prevent an occupant in an unsuitable position from being affected by a rear bag section.

According to a second aspect, in the vehicle side airbag device of the above first aspect, the front-rear left-right partitioning cloth may include a left cloth and a right cloth in a row in the vehicle width direction in the inflated and deployed state.

In the second aspect, the rear bag section is partitioned into the left and right chambers by the left cloth and the right cloth that are placed in a row in the vehicle width direction, in the inflated and deployed state of the bag body. Thus, even in a case in which the left and right chambers that are inflated and deployed impinge from the vehicle rear side to an occupant in an unsuitable position, the effect on the occupant may be reduced, since the left and right chambers escape in separate directions from each other (the vehicle width direction).

According to a third aspect, in the vehicle side airbag device of the above aspects, a front edge portion of the tether may he stitched to a front portion of the at least one chamber, and a rear edge portion of the tether may be stitched to a rear portion of the at least one chamber.

In the third aspect, inflation thicknesses in the vehicle width direction and in the vehicle from-rear direction of the chamber at which the tether is provided may be adjusted by changing the stitching position of the front edge portion of the tether with respect to the front portion of the chamber at which the tether is provided, and the stitching position of the rear edge portion of the tether with respect to the rear portion of the chamber at which the tether is provided.

According to a forth aspect, in the vehicle side airbag device of the above aspects, in the bag body, outer peripheral edge portions of a base cloth folded in two along a fold portion positioned, at a front edge portion of the bag body may be stitched together at an outer peripheral stitch portion; and a rear edge portion of the front-rear left-right partitioning cloth may be stitched together with a rear edge portion of the bag body at the outer peripheral stitch portion.

In the fourth aspect, the rear edge portion of the front-rear left-right partitioning cloth is stitched together with the rear edge portion of the bag body at the outer peripheral stitch. portion, in a case in which the base cloth is folded in two and the outer peripheral edge portions of the base cloth of the bag body are stitched together at the outer peripheral stitch portion. According to the forth aspect, the number of stitching processes may be reduced. Moreover, since there is no need to stitch the fold portion of the base cloth at the outer peripheral stitch portion, the forth aspect may reduce the stitch length.

According to a fifth aspect, the vehicle side airbag device of the above aspects may further include an up-down partitioning cloth that partitions the bag body into the front bag section and the rear bag section, and a lower bag section.

In the fifth aspect, the bag body is partitioned into the front bag section, the rear bag section, and the lower bag section.

Accordingly, the fifth aspect may enable the internal pressures of the respective bag sections to be individually adjusted according to the load resistance at each portion of an occupant, in a case in which, for example, front portions of the chest and abdominal region of the occupant are restrained by the front bag section, rear portions of the chest and abdominal region of the occupant are restrained by the rear bag section, and the lumbar region of the occupant is restrained by the lower bag section.

A sixth aspect is a manufacturing method of a side airbag provided at the vehicle side airbag device according to the forth aspect, the side airbag manufacturing method including: superimposing one or two of the tethers on one or both sides in a direction orthogonal to the fold portion of the base cloth prior to being folded in two, superimposing a left cloth and a right cloth provided at the front-rear left-right partitioning cloth on both the sides of the base cloth, and stitching front edge portions positioned at the fold portion side of the left cloth and the right cloth, and of the one or two tethers, to the base cloth at front edge stitch portions; folding the base cloth in two along the fold portion, and stitching intermediate portions in a direction orthogonal to the fold portion of the left cloth and the right cloth together at an intermediate stitch portion running, parallel to the front edge stitch portions; and stitching a rear edge portion of the one or two tethers to the base cloth at a rear edge stitch portion and stitching outer peripheral edge portions of the base cloth that has been folded in two to upper edge portions, rear edge portions, and lower edge portions of the left cloth and the right cloth at the outer peripheral stitch portion, or, stitching together the rear edge portion of the one or two tethers while stitching the outer peripheral edge portions of the base cloth that has been folded in two to the upper edge portions, the rear edge portions, and the lower edge portions of the left cloth and the right cloth at the outer peripheral stitch portion.

In the sixth aspect, a side airbag provided to the vehicle side airbag device described in the fourth aspect may be manufactured by performing the first to third processes described above. A vehicle side airbag device provided with the side airbag may obtain similar operation and function as described in the fourth aspect.

A seventh aspect is a manufacturing method of a side airbag provided at the vehicle side airbag device according to the fourth aspect and fifth aspect, the side airbag manufacturing method including: superimposing the up-down partitioning cloth at one side in a direction along the fold portion of the base cloth prior to being folded in two, and stitching an upper edge portion of the up-down partitioning cloth positioned at the other side in the direction along the fold portion to the base cloth at an upper edge stitch portion; superimposing one or two of the tethers on a center side in the direction along the fold portion, and on one or both sides in a direction orthogonal to the fold portion of the base cloth, superimposing a left cloth and a right cloth provided at the front-rear left-right partitioning cloth on both the sides of the base cloth, and stitching front edge portions positioned at the fold portion side of the left cloth and the right cloth, and of the one or two tethers, to the base cloth at front edge stitch portions; folding the base cloth and the up-down partitioning cloth in two along the fold portion, and stitching intermediate portions in a direction orthogonal to the fold portion of the left cloth and the right cloth together at an intermediate stitch portion running parallel to the front edge stitch portions and stitching together lower edge portions positioned at an opposite side from the upper edge stitch portion of the up-down partitioning cloth folded in two at a lower edge stitch portion; and stitching a rear edge portion of the one or two tethers to the base cloth at a rear edge stitch portion and stitching outer peripheral edge portions of the base cloth that has been folded in two to upper edge portions and rear edge portions of the left cloth and the right cloth and at the outer peripheral stitch portion, or, stitching together the rear edge portion of the one or two tethers while stitching the outer peripheral edge portions of the base cloth that has been folded in two to the upper edge portions and the rear edge portions of the left cloth and the right cloth and at an outer peripheral stitch portion.

In the seventh aspect, a side airbag provided to the vehicle side airbag device described in the fifth aspect and the fourth aspect may be manufactured by performing the first to fourth processes described above. A vehicle side airbag device provided with the side airbag may obtain similar operation and function as described in the fifth aspect.

As explained above, the vehicle side airbag device and the manufacturing method of a side airbag according to the above aspects may suppress or prevent an occupant in an unsuitable position from being affected by a rear bag section.

BRIEF DESCRIPTION OF THE DRAWINGS

Exemplary embodiments will be described in detail based on the following figures, wherein.

DETAILED DESCRIPTION

First Exemplary Embodiment

Explanation follows regarding a vehicle side airbag device 10 and a manufacturing method of a side airbag 20 according to a first exemplary embodiment, based on FIG. 1 to FIG. 17. Note that in each of the drawings as appropriate, the arrow FR, the arrow UP, and the arrow OUT respectively indicate the front direction (the direction of travel), the tipper direction, and the outside in the vehicle width direction of a vehicle. In the following explanation, unless specifically stated otherwise, explanation using simply the front-rear, left-right, and up-down directions refers to the front-rear of the vehicle front-tear direction, the left-right of the vehicle left-right direction (vehicle width direction), and the up-down of the vehicle up-down direction.

Figure 1:
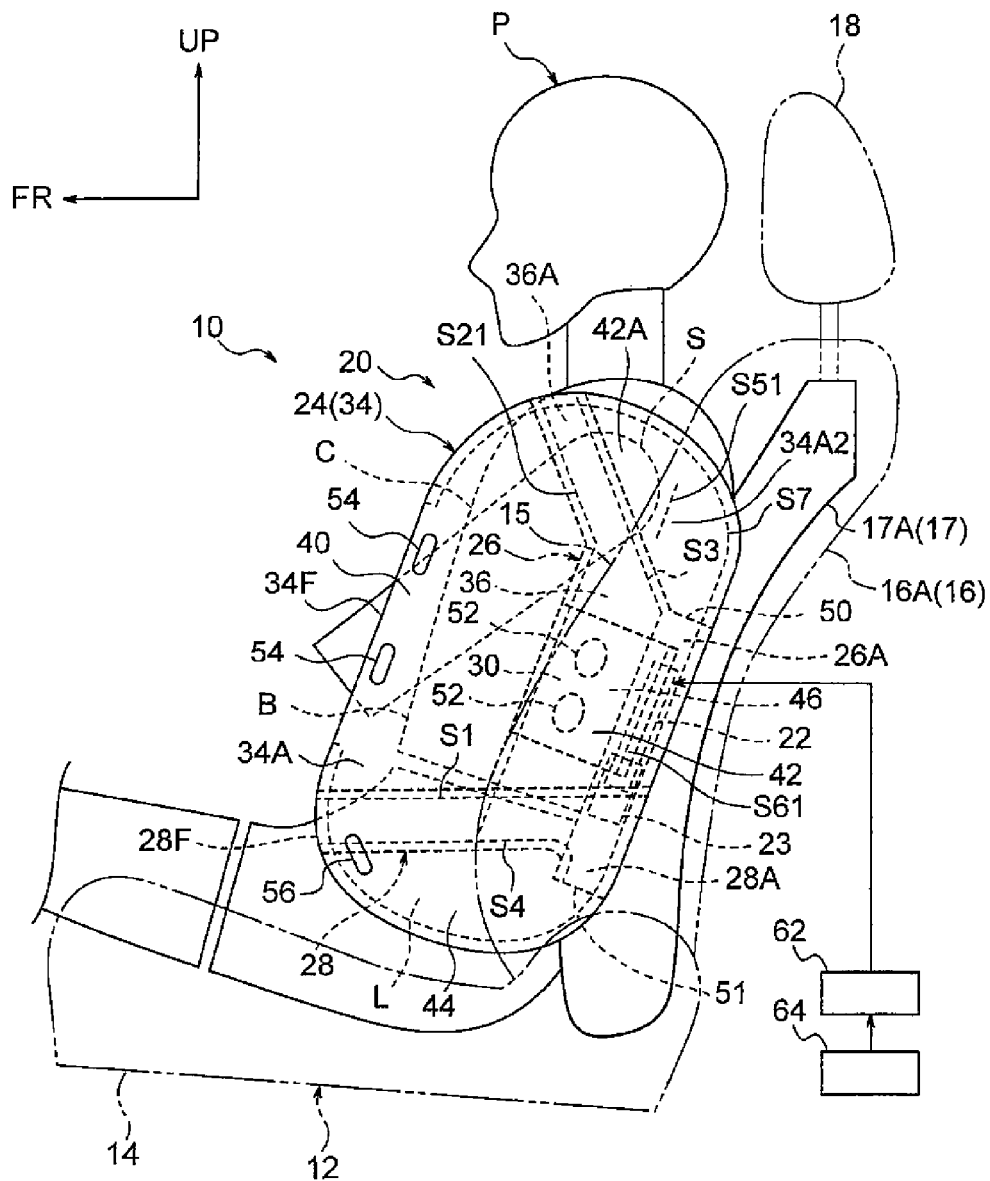
FIG. 1 is a side view of as vehicle seat installed with a vehicle side airbag device illustrated in an inflated and deployed state according to a first exemplary embodiment.

A vehicle seat 12 illustrated in FIG. 1 is, for example, a driving seat in a left-hand drive automobile. The vehicle seat 12 includes a seat cushion 14 on which an occupant P sits, a seatback 16 that supports the back of the occupant P, and a headrest 18 that supports the head of the occupant P. Note that, in the present exemplary embodiment, the front-rear direction, left-right direction (width direction), and up-down direction of the vehicle seat 12 are aligned with the front-rear direction, left-right direction (width direction), and up-down direction of the vehicle. In FIG. 1, a crash test dummy P is illustrated seated in the vehicle seat 12 instead of an actual occupant. The dummy P is, for example, a World Side Impact Dummy (World SID) of a $50^{th}$ percentile American adult male (AM50). The dummy P is seated in a standard seated posture specified in crash testing methods. A front-rear position of the seat cushion 14 with respect to the vehicle, and a slope position (slope angle) of the seatback 16 with respect to the seat cushion 14, are adjusted to reference set positions corresponding to the seated posture. In order to facilitate understanding of the explanation, the dummy P is hereafter referred to as "occupant P".

A side support section 16A is provided to a side section at the vehicle width direction outside of the seatback 16. The side support section 16A projects out (bulges) further to the vehicle front side than a backrest face (not illustrated in the drawings) of the seatback 16, and is configured so as to support the occupant P front the vehicle width direction outside. The side airbag 20, this being a configuration member of the vehicle side airbag device 10, and an inflator 22 (gas generator) that generates gas inside the side airbag 20 are housed inside the side support section 16A.

The side airbag 20 is folded and housed inside the side support section 16A in a modular (packaged) state together with the inflator 22. The side airbag 20 inflates and deploys toward the vehicle front side of the side support section 16A due to pressure of gas generated by the inflator 22, so as to he interposed between the occupant P and as vehicle body side section (a door trim of a side door, not illustrated in the drawings, in this example). A pad member and cover member installed to the side support section 16A rupture under the inflation pressure of the side airbag 20 during inflation and deployment, such that a burst line portion set at a front portion (a front edge portion 15 in this example) oldie side support section 16A splits open. An opening in order for the side airbag 20 to inflate and deploy toward the outside of the side support section 16A is thereby formed at the front edge portion 15 of the side support section 16A. Note that, unless specifically stated otherwise, the front-rear, left-right, and up-down directions of the side airbag 20 described in the below explanation refer to directions of the side airbag 20 in an inflated and deployed state, and are aligned with front-rear, left-right, and up-down directions of the seatback 16.

Figure 2:
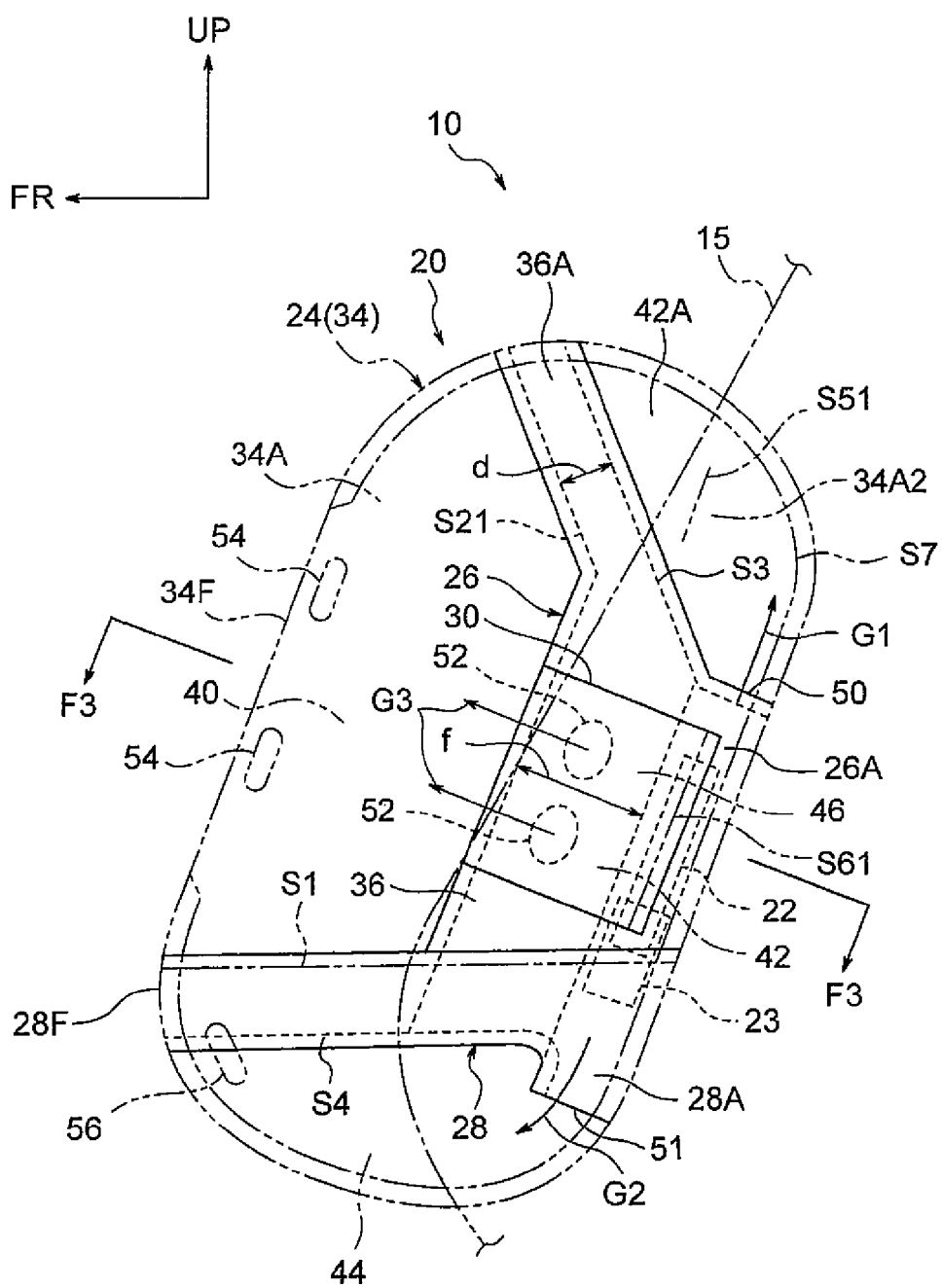
FIG. 2 is an enlarged side view of the side airbag illustrated in FIG. 1.
Figure 3:
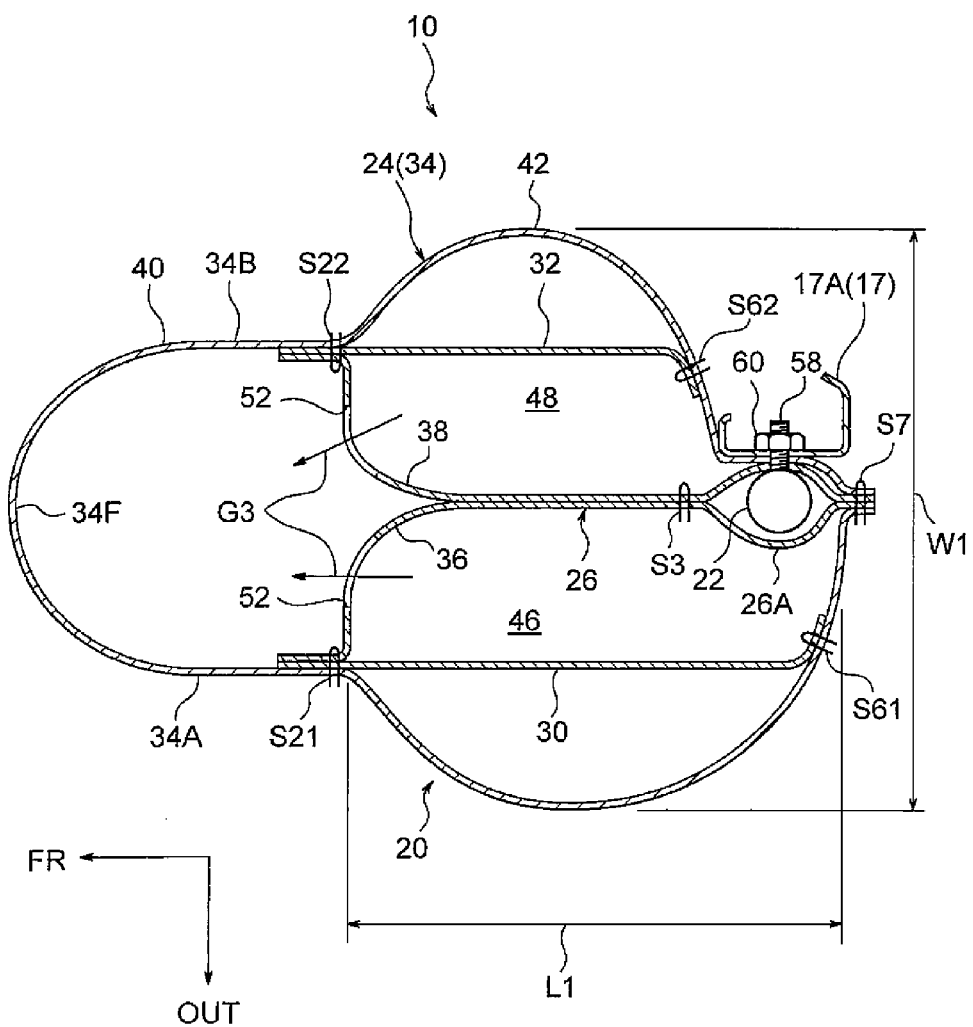
FIG. 3 is an enlarged cross-sectional view taken along line F3-F3 in FIG. 2.

As illustrated in FIG. 1 to FIG. 3, the side airbag 20 is configured by a bag body 24 formed in a bag shape, a front-rear left-right partitioning cloth 26 that partitions the inside of the bag body 24 into front and rear, an up-down partitioning cloth 28 that partitions the inside the bag body 24 into top and bottom, and a pair of left and right tethers (inflation limiting tethers, restricting tethers) 30, 32. The bag body 24 is formed from a single base cloth (main panel) 34 formed cut out of a cloth, material made of nylon thread or polyester thread, for example, folded in two, and formed in art elongated bag shape by stitching together outer peripheral edge portions at an outer peripheral stitch portion S7. As illustrated in FIG. 1, when viewed from the side in the inflated and deployed state, the bag body 24 is formed so as to form an elongated, substantially elliptical shape (substantially rectangular shape) running along the up-down direction of the seatback 16, and is set to a size capable of restraining the shoulder region S, the chest region C, the abdominal region B, and the lumbar region L of the occupant P. In the inflated and deployed state, a fold portion 34F at which the base cloth 34 is folded in two is configured so at to be positioned at a front edge portion of the bag body 24.

The front-rear left-right partitioning cloth (front-rear partitioning section) 26 includes a left cloth 36 serving as a left side partitioning cloth, and a right cloth 38 serving as a right side partitioning cloth. The left cloth 36 and the right cloth 38 are each formed by cutting out a cloth material similar to the base cloth 34 of the bag body 24, and are each formed in an elongated shape with length along the up-down direction (length direction) of the bag body 24. Front-rear direction intermediate portions (locations between front edge portions and rear edge portions) of the left cloth 36 and the right cloth 38 that overlap each other are stitched together at an intermediate stitch portion S3 extending along the up-down direction of the bag body 24. Upper edge portions and the rear edge portions of the left cloth 36 and the right cloth 38 are stitched together with an upper edge portion and a rear edge portion of the bag body 24 at the outer peripheral stitch portion S7. The front edge portion of the left cloth 36 is stitched to a front-rear direction intermediate portion of one side portion 34A of the base cloth 34 at a front edge stitch portion S21. that extends along the up-down direction of the bag body 24 running parallel to the intermediate stitch portion S3. The front edge portion of the right cloth 38 is stitched to a front-rear direction intermediate portion of the other side portion 3413 of the base cloth 34 at a front edge stitch portion S22 that extends along the up-down direction of the bag body 24 running parallel to the intermediate stitch portion S3.

Figure 4:
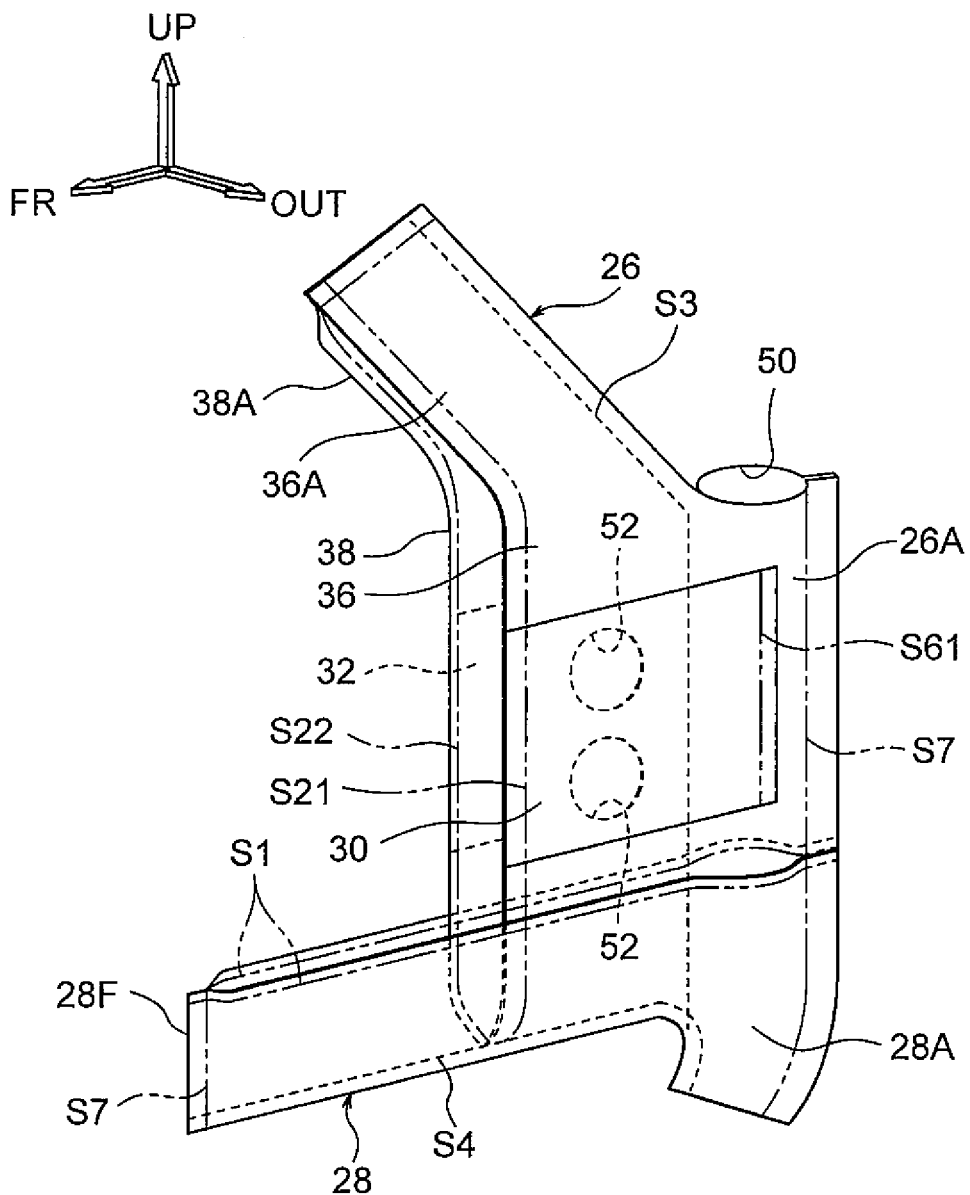
FIG. 4 is a perspective view of a front-rear left-right partitioning cloth, an up-down partitioning cloth, and tethers provided to the side airbag illustrated in FIG. 1.
Figure 5:
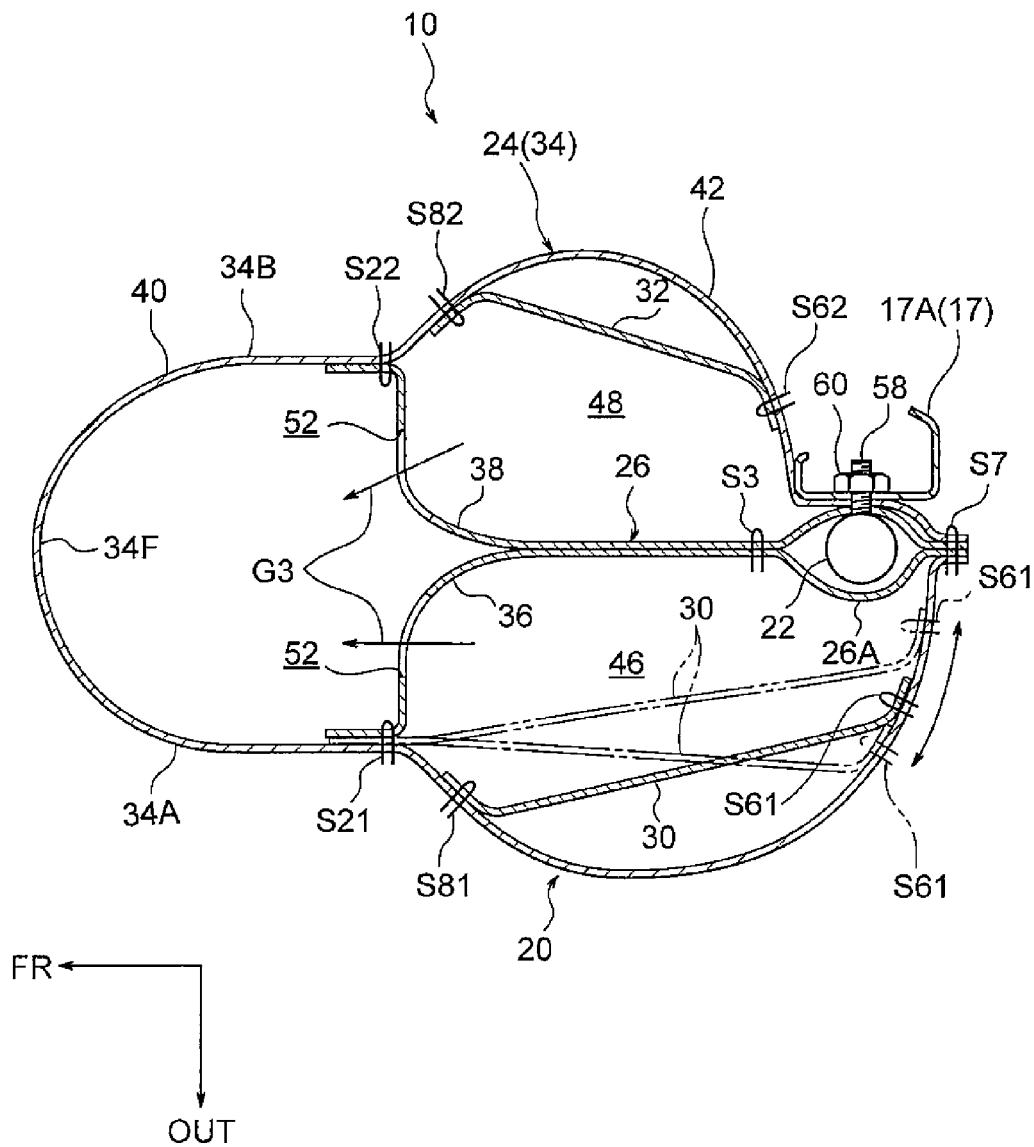
FIG. 5 is a cross-sectional view corresponding to FIG. 3, illustrating a modified example of stitching positions of tethers with respect to left and right chambers.

A cylindrical shaped flow regulating portion 26A is formed at a rear portion of the front-rear left-right partitioning cloth 26. The axial line direction of the flow regulating portion 26A runs along the up-down direction of the bag body 24 and is installed at an up-down direction intermediate portion of a rear end portion inside the bag body 24. The flow regulating portion 26A configures a diffuser for regulating the flow of gas (distributing gas to the top and bottom) from the inflator 22. As illustrated in FIG. 1, FIG. 2, and FIG. 4, portions of the left cloth 36 and the right cloth 38 that are further to an upper end side than the flow regulating portion 26A configure front extension portions 36A, 38A that extend diagonally upward toward the front of the bag body 24. Width dimensions of the left cloth 36 and the right cloth 38 decrease at the front extension portions 36A, 38A.

The front-rear left-right partitioning cloth 26 with the above configuration partitions the inside of the bag body 24 into a front bag section 40 and a rear bag section 42. The left cloth 36 and the right. cloth 38 of the front-rear left-right partitioning cloth 26 are provided so as to be in a row in the vehicle width direction in the inflated and deployed state of the bag body 24 (side airbag 20). The left cloth 36 and the right cloth 38 are set so as to extend in a bifurcated shape on progression from an outer peripheral portion of the flow regulating portion 26A positioned at a rear end portion inside the rear bag section 42 toward a front-rear direction intermediate portion of the bag body 24, and partition the inside of the rear bag section 42 into a left chamber 46 and a right chamber 48, these being a pair of left and right chambers.

In the side airbag 20 in which the inside of the bag body 24 is partitioned by the front-rear left-right partitioning cloth 26, a front extension portion 42A, extending toward the upper side of the front bag section 40, is formed at an upper portion of the rear bag section 42. The upper portion inside the rear bag section 42 including the front extension portion 42A is configured so as not to be partitioned into the left chamber 46 and the right chamber 48. The flow regulating portion 26A does not reach as far as an upper edge portion of the rear bag section 42, and an upper end opening 50 opens at a region at the upper portion inside the rear bag section 42 that is not partitioned. The left and right chambers 46, 48 and the inside of the flow regulating portion 26A are placed in communication with each other through the upper end opening 50. A pair of upper and lower communication holes 52 (openings) are formed to both the left cloth 36 and the right cloth 38, and the left and right chambers 46, 48 and the inside of the front bag section 40 are placed in communication with each other through the communication holes 52.

Figure 12:
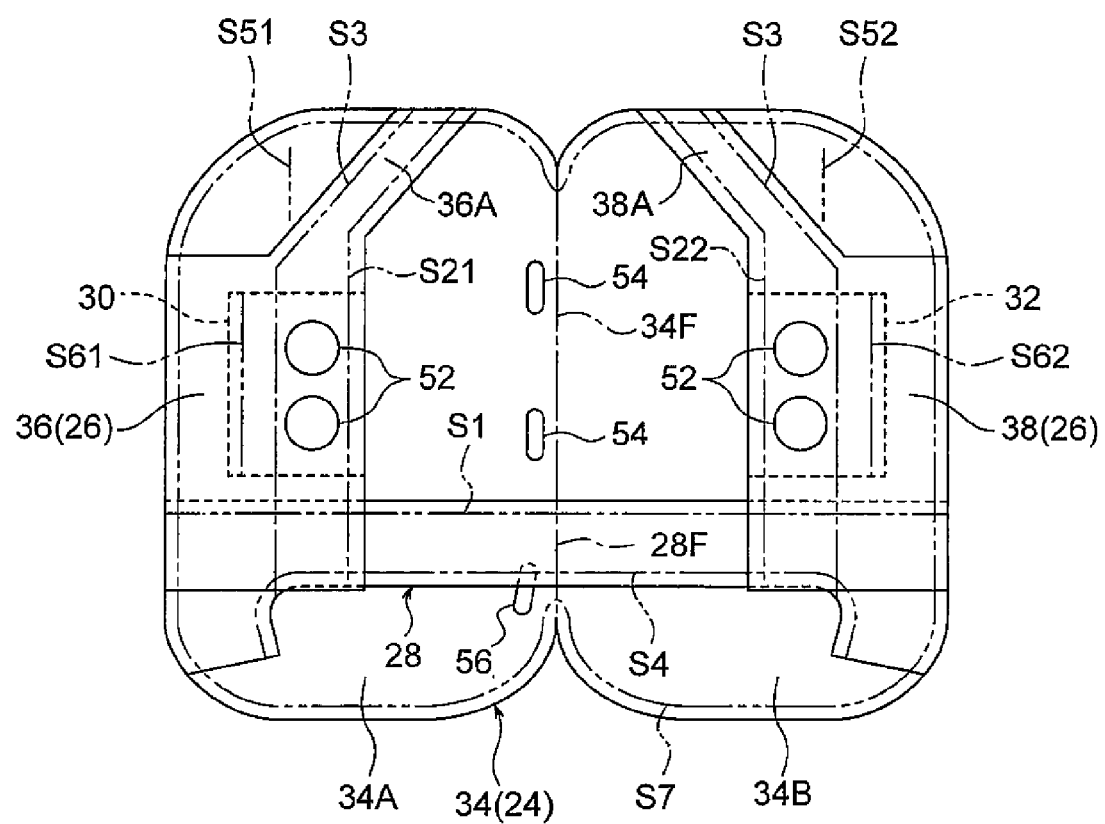
FIG. 12 is an opened out plan view illustrating a state prior to stitching the side airbag illustrated in FIG. 1.
Figure 13:
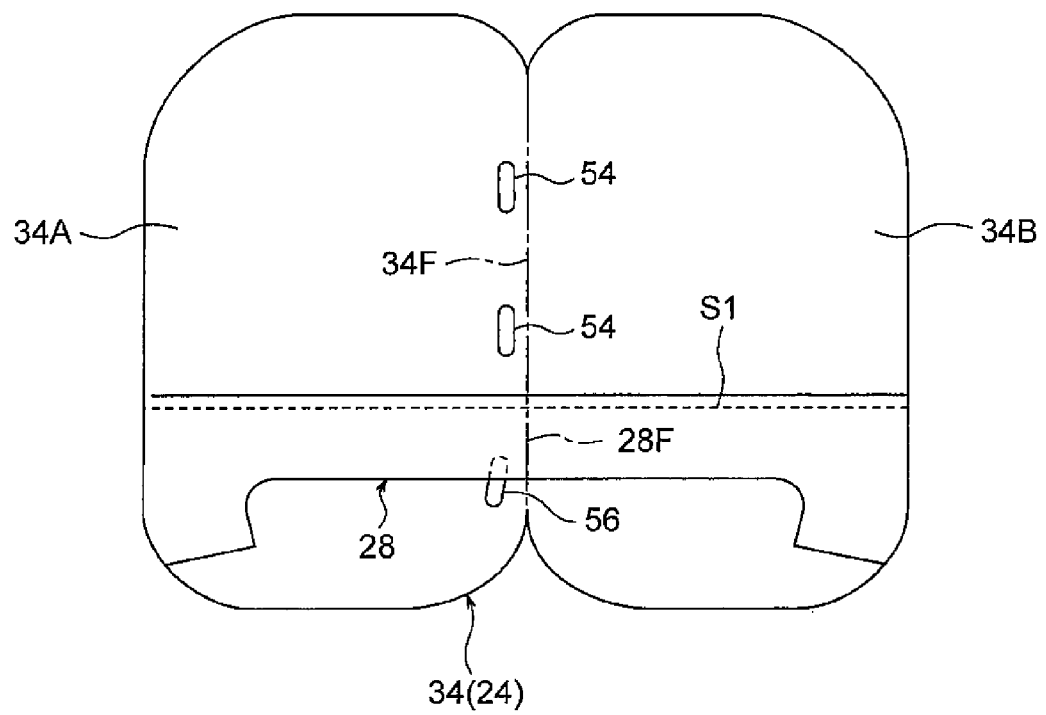
FIG. 13 is an explanatory diagram for explaining a first process in a manufacturing process of the side airbag.

The left cloth 36 and the right cloth 38 of the front-rear left-right partitioning cloth 26 do not reach as far as a lower edge portion of the bag body 24, and a lower bag section 44 that is partitioned from the front bag section 40 and the rear bag section 42 by the up-down partitioning cloth 28 is formed at a lower portion of the bag body 24. The up-down partitioning cloth 28 is thrilled by cutting out a cloth material similar to the base cloth 34 of the bag body 24 into an elongated belt shape, and, as illustrated in FIG. 12 and FIG. 13, has a length dimension that is the same as a width dimension of the base cloth 34 prior to being folded in two (a dimension in a direction orthogonal to the fold portion 34F).

The up-down partitioning cloth 28 is folded in two by folding a length direction intermediate portion thereof at a fold portion 28F running along the fold portion 34F of the base cloth 34 (see FIG. 4), and is installed at the lower portion side of the bag body 24 oriented with its length direction along the width direction of the base cloth 34. One long side edge portion (lower edge portion) of the folded-over up-down partitioning cloth 28 is positioned at the lower edge portion side of the hag body 24, and one side portion and the other side portion of the one long side edge portion on either side of the fold portion 28F are superimposed on each other, and stitched together at a lower edge stitch portion 54 extending along the front-rear direction of the bag body 24. The other long side edge portion (upper edge portion) of the folded-over up-down partitioning cloth 28 has one side portion on one side of the fold portion 28F stitched to the one side portion 34A of the base cloth 34 at an upper edge stitch portion S1, and has the other side portion on the other side of the fold portion 28F stitched to the other side portion 34B of the base cloth 34 at the upper edge stitch portion S1.

The up-down partitioning cloth 28 extends toward the lower side of the bag body 24 at a rear end portion of the up-down partitioning cloth 28, and the lower edge stitch portion S4 curves toward the lower edge portion side of the bag body 24 along a front edge portion of this extended portion. Accordingly, a tube shaped check valve 28A is formed extending toward the lower side of the bag body 24 at the rear end portion of the up-down partitioning cloth 28. The inside of the flow regulating portion 26A and the inside of the lower bag section 44 are placed in communication with each other through the check valve 28A and a lower end opening 51 of the flow regulating portion 26A.

As illustrated in FIG. 1 and FIG. 2, a pair of upper and lower vent holes 54 (openings) are formed to a front edge portion of the front bag section 40 of the side airbag 20, and a vent hole 56 (opening) is formed to a front edge portion of the lower bag section 44. The vent holes 54 place the inside of the front bag section 40 and the outside of the side airbag 20 in communication with each other, and the vent hole 56 places the inside of the lower bag section 44 and the outside of the side airbag 20 in communication with each other.

The pair of left and right tethers 30, 32 are provided to the left and right chambers 46, 48 of the rear bag section 42. As illustrated in FIG. 3, the one tether 30 provided to the left chamber 46 has a front edge portion stitched to a front portion of the left chamber 46, and a rear edge portion stitched to a rear portion of the left chamber 46. The other tether 32 provided to the right chamber 48 has a front edge portion stitched to a front portion of the right chamber 48 and a rear edge portion stitched to a rear portion of the right chamber 48.

Specifically, the front edge portion of the one tether 30 is stitched to the from-rear direction intermediate portion of the one side portion 34A of the base cloth 34 and to the front edge portion of the left cloth 36 at the front edge stitch portion S21. Further, the rear edge portion of the one tether 30 is stitched to a rear portion of the base cloth 34 at a rear edge stitch portion S61. The front edge portion of the other tether 32 is stitched to the front-rear direction intermediate portion of the other side portion 34B of the base cloth 34 and to the front edge portion of the right cloth 38 at the front edge stitch portion S22, and the rear edge portion of the other tether 32 is stitched to the rear portion of the base cloth 34 at a rear edge stitch portion S62. Note that, in the present exemplary embodiment, the tethers 30, 32 are respectively provided to the left and right left chambers 46, 48. However, configuration is not limited thereto, and a configuration may be applied in which one of the tethers 30, 32 is omitted.

As illustrated in FIG. 3, the tethers 30, 32 are set so as to extend along the vehicle front-rear direction in the inflated and deployed state of the side airbag 20. Further, the tethers 30, 32 are each set with a length dimension so as to bear tension (stretch) in the vehicle front-rear direction in the inflated and deployed state of the side airbag 20. Accordingly, configuration is made such that inflations in the tell and right chambers 46, 48 toward the vehicle front side are restricted (suppressed) to be within a pre-set range by the tethers 30, 32. An inflation thickness W1 of the rear bag section 42 in the vehicle width direction, and an inflation thickness L1 of the rear bag section 42 in the vehicle front-rear direction may be adjusted by changing the length dimensions of the tethers 30, 32.

In the present exemplary embodiment, the inflation thickness W1 of the rear bag section 42 in the vehicle width direction, and the inflation thickness L1 of the rear bag section 42 in the vehicle front-rear direction may be adjusted by changing stitched positions of the tethers 30, 32 with respect to the left and right chambers 46, 48. As illustrated in the example in FIG. 5, as a modified example of the stitched positions, the front edge portions of the tethers 30, 32 may be configured stitched to the one side portion 34A and the other side portion 34B of the base cloth 34 at different stitch portions S81, S82, set further to the rear edge side of the bag body 24 than the front edge stitch portions S21, S22. Moreover, the stitched position of the rear edge portion of the tether 30 with respect to the rear portion of the one side portion 34A of the base cloth 34 may be changed, for example, as illustrated by the single-dotted dashed line and the double-dotted dashed line in FIG. 5. As illustrated in the example in FIG. 6, the rear edge portions of the tethers 30, 32 may also be configured stitched to the bag body 24 and the rear edge portions of the left cloth 36 and the right cloth 38 at the outer peripheral stitch portion S7.

Figure 6:
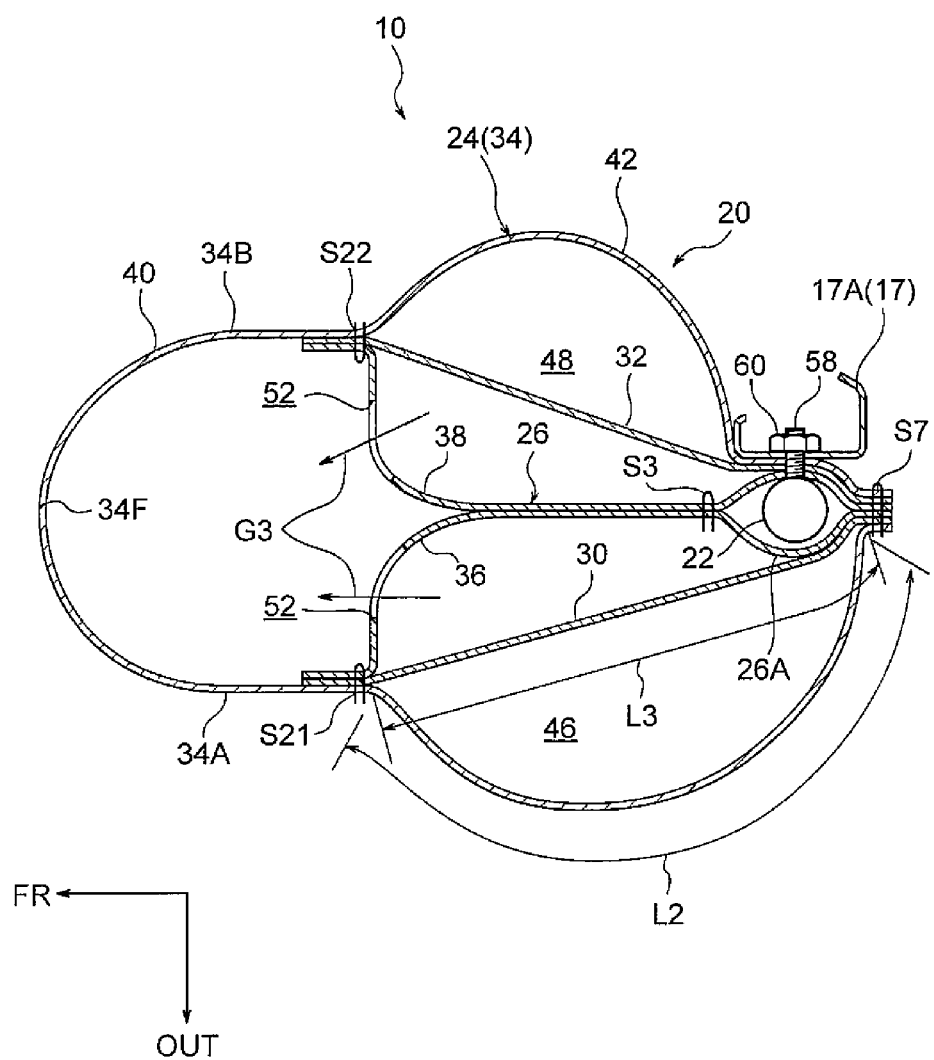
FIG. 6 is a cross-sectional view corresponding to FIG. 3, illustrating another modified example of stitching positions of tethers with respect to left and right chambers.
Figure 7:
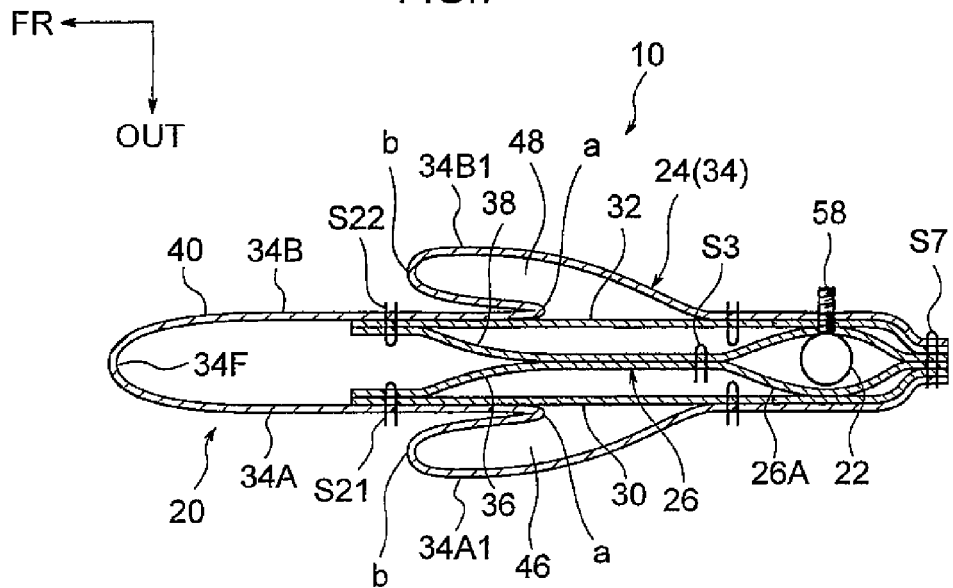
FIG. 7 is a cross-sectional view corresponding to FIG. 3, illustrating an example of a state of an opened out plan view profile (a non-inflated opened out state) of the side airbag illustrated in FIG. 6.
Figure 8:
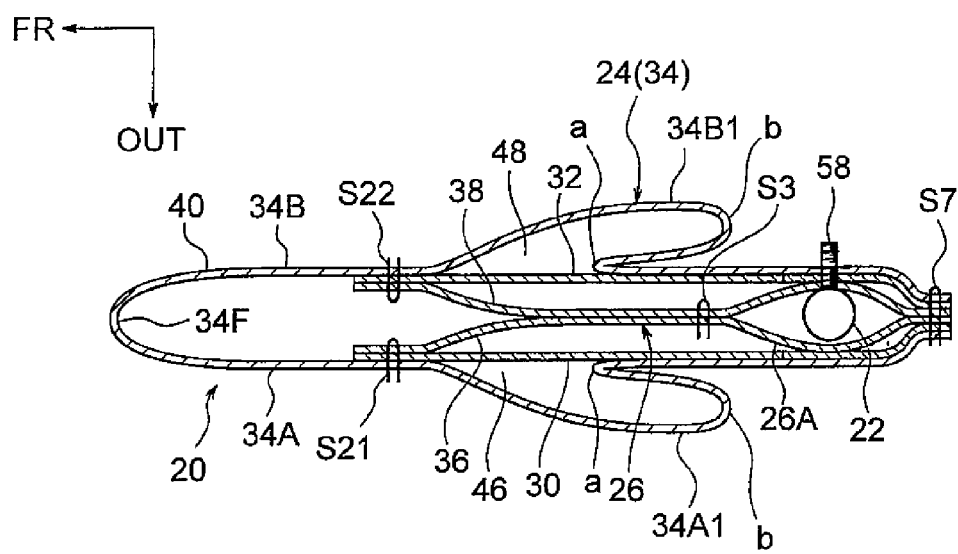
FIG. 8 is a cross-sectional view corresponding to FIG. 3, illustrating another example of a state of an opened out plan view profile (a non-inflated opened out state) of the side airbag illustrated in FIG. 6.

To explain using the example illustrated in FIG. 6, in the side airbag 20 according to the present exemplary embodiment, a peripheral length of a location of the one side portion 34A and the other side portion 34B of the base cloth 34 configuring the rear bag section 42 (see L2 in FIG. 6) is set longer than a length dimension of a location of the tethers 30, 32 positioned inside the left and right chambers 46, 48 (see L3 in FIG. 6). As illustrated in FIG. 7 and FIG. 8, when the side airbag 20 is opened out in a plan view profile, excess length portions 34A1, 34B1 occurring at the one side portion 34A and the other side portion 34B are configured folded toward the front side or the rear side of the bag body 24. The side airbag 20 opened out in the plan view profile illustrated in FIG. 7 or FIG. 8 is configured folded by a specific folding method such as rolling or pleating.

Figure 9:
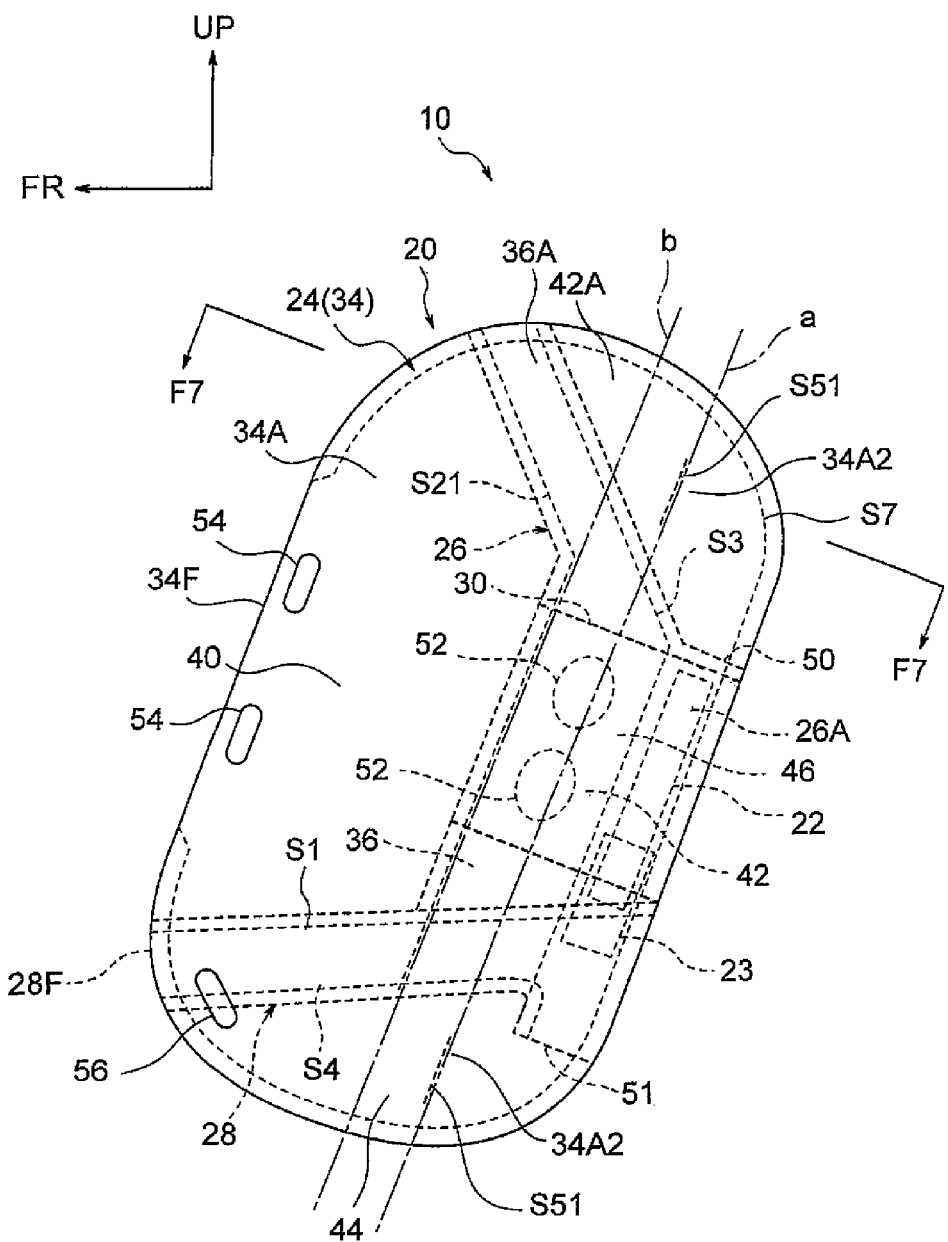
FIG. 9 is a side view of the state of the opened out plan view profile illustrated in FIG. 7 viewed from the side.

FIG. 9 is a side view illustrating the state of the opened out plan view profile illustrated in FIG. 7 viewed from the side. The single-dotted dashed lines a, b illustrated in FIG. 9 are hypothetical lines along the up-down direction of the bag body 24, and these hypothetical lines pass through fold portions appended with the reference numerals a, b in FIG. 7. As illustrated in FIG. 9, slack stitch portions S51, S52 are set at the upper portion of the rear bag section 42 and at the lower bag section 44 at locations overlapping the single-dotted dashed line a (or peripheral locations thereto).

Figure 10:
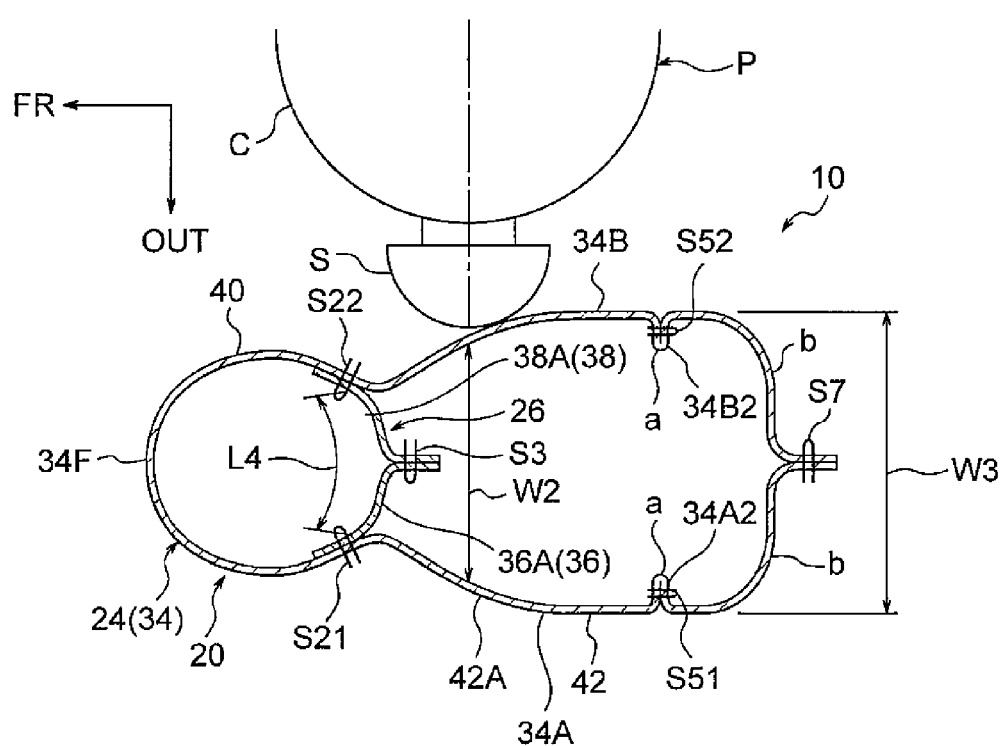
FIG. 10 is a cross-sectional view for explaining stitching processing with respect to slack occurring in a base cloth of a rear bag section at a height corresponding to a cross-section taken along line F7-F7 in FIG. 9, illustrating an inflated and deployed state of the side airbag illustrated in FIG. 6.

Namely, in the side airbag 20 provided with the tethers 30, 32 as in the present exemplary embodiment, slack portions 34A2, 34B2 sometimes occur at locations of the one side portion 34A and the other side portion 34B of the base cloth 34 positioned further to the upper side and the lower side of the bag body 24 than the tethers 30, 32 (see FIG. 10). Thus when manufacturing the side airbag 20, the locations of the base cloth 34 at which the slack portions 34A2, 34B2 occur are configured stitched at the slack stitch portions S51, S52 extending along the up-down direction of the bag body 24. In the example illustrated in FIG. 10, an inflation thickness W2 at a location of the rear bag section 42 restraining the center of the shoulder region S of the occupant P is adjusted by a width dimension L4 of the front-rear left-right partitioning cloth 26. In the example illustrated in FIG. 10 an inflation thickness W3 at a location of the rear bag section 42 further to the rear side than the shoulder region S is adjusted by the positions of the slack stitch portions S51, S52. Thus, the W3 can be set larger than the W2.

Figure 11:
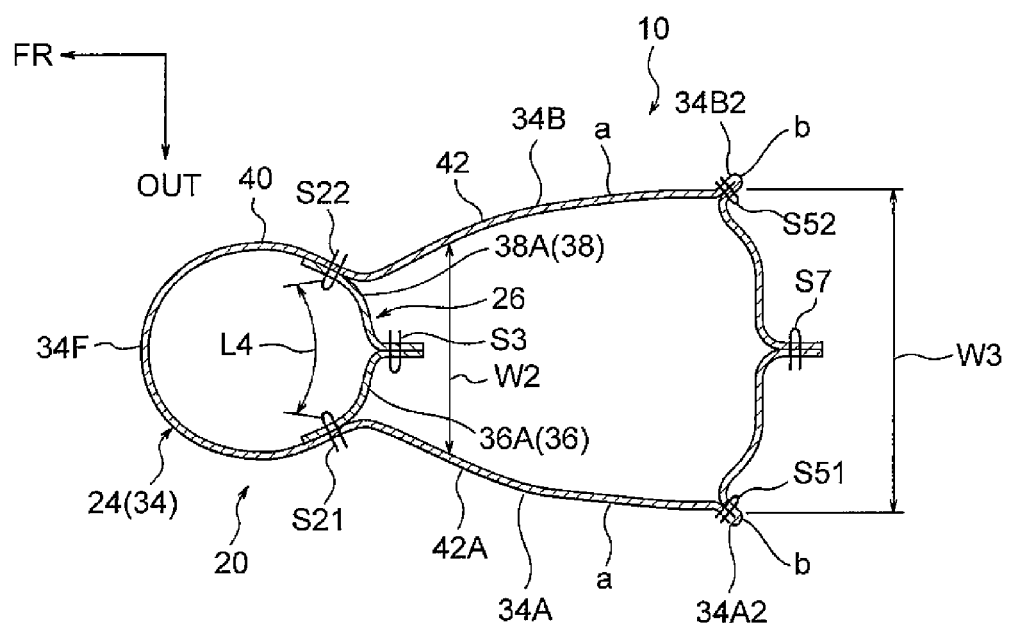
FIG. 11 is a cross-sectional view corresponding to FIG. 10, for explaining another example of the stitching processing.

Note that, when the excess length portions 34A1, 34B1 of the base cloth 34 are folded as illustrated in FIG. 8, the slack stitch portions S51, S52 are set on the hypothetical lines extending along the up-down direction of the bag body 24 passing through the fold portions b (see FIG. 11). In the example illustrated in FIG. 11, the inflation thickness W2 at a location of the rear bag section 42 restraining the center of the shoulder region S of the occupant P is adjusted by the width dimension L4 of the front-rear left-right partitioning cloth 26. In the example illustrated in FIG. 11, the inflation thickness W3 at a location of the rear bag section 42 further to the rear side than the shoulder region S is adjusted by the positions of the slack stitch portions S51, S52. Thus, the W3 can be set larger than the W2.

The inflator 22 of the present exemplary embodiment is what is referred to as a cylinder type inflator, formed in a circular cylindrical shape. The inflator 22 is housed inside the flow regulating portion 26A oriented with its axial line direction along the up-down direction of the seatback 16. A pair of upper and lower stud bolts 58 project out from outer peripheral portions of the inflator 22 toward the vehicle width direction inside (seat width direction inside). The stud bolts 58 pierce through the flow regulating portion 26A and the bag body 24, and pierce through a side frame 17A of a seatback frame 17, this being a frame member of the seatback 16, and nuts 60 are screwed onto leading end sides of the stud bolts 58. The inflator 22 is thereby fastened and fixed to the side frame 17A together with the side airbag 20 (what is referred to as side face fastening). Note that a configuration may be applied in which the stud bolts 58 project out from outer peripheral portions of the inflator 22 toward the vehicle rear side, pierce through the flow regulating portion 26A, the bag body 24, and brackets fixed to the side frame 17A, and are screwed together with the nuts 60 (what is referred to as back face fastening).

As illustrated in FIG. 1, the inflator 22 is electrically connected to a side collision ECU 62 mounted to the vehicle. A side collision sensor 64 that detects a side-on collision is electrically connected to the side collision ECU 62. The side collision ECU 62 is configured to operate (actuate) the inflator 22 in a case in which (the inevitability of) a side-on collision has been detected based on a signal from the side collision sensor 64. Note that, in cases in which a pre-crash sensor that predicts (forecasts) a side-on collision is electrically connected to the side collision ECU 62, the inflator 22 may be configured to be operated when the side collision ECU 62 has predicted a side-on collision based on a signal from the pre-crash sensor.

In the side airbag device 10 with the above configuration, gas is ejected in radiating directions from a gas ejection port provided to an upper end portion or as lower end portion (the lower end portion in this example) of the inflator 22 when operation of the inflator 22. A circular cylindrical shaped diffuser 23 is fixed to the gas ejection port side of the inflator 22, and gas ejected from the gas ejection port is distributed to the upper side and the lower side inside the flow regulating portion 26A by the diffuser 23. Gas distributed to the upper side inside the flow regulating portion 26A is supplied into the left and right chambers 46, 48 of the rear bag section 42 from the upper end opening 50 of the flow regulating portion 26A (see the arrow G1 in FIG. 2). Gas distributed to the lower side inside the flow regulating portion 26A is supplied into the lower bag section 44 through the lower end opening 51 of the flow regulating portion 26A and the check valve 28A (see the arrow G2 in FIG. 2). Some of the gas supplied to the left and right chambers 46, 41 of the rear bag section 42 is supplied into the front bag section 40 through the communication holes 52 formed to the left cloth 36 and the right cloth 38 (see the arrows G3 in FIG. 2 and FIG. 3). Accordingly, the bag body 24 of the side airbag 20 inflates and deploys toward the vehicle front side of the side support section 16A, and is interposed, between the occupant P and the door trim of the side door.

In the inflated and deployed state of the bag body 24, namely, the side airbag 20, front portions (front half portions) of the chest region C and abdominal region B of the occupant P are restrained by the front bag section 40, rear portions (rear half portions) of the chest region C and abdominal region B of the occupant P are restrained by the rear bag section 42, and the lumbar region L of the occupant P is restrained by the lower bag section 44. The front extension portion 42A provided to the upper portion of the rear bag section 42 extends toward the upper side of the front bag section 40 and restrains the shoulder region S of the occupant P. In the present exemplary embodiment, the respective inflation thicknesses of a location of the rear bag section 42 that restrains the shoulder region S and a location of the rear bag section 42 that restrains the rear portion of the chest region C may be individually adjusted by changing a width dimension d and a width dimension f of the left cloth 36 and the right cloth 38 of the front-rear left-right partitioning cloth 26, illustrated in FIG. 2.

In the side airbag 20, the internal pressures of the rear bag section 42 and the lower bag section 44, that are supplied with gas from the inflator 22 through the upper end opening 50 of the flow regulating portion 26A and the check valve 28A, rise at an earlier stage and at a higher pressure than the internal pressure of the front bag section 40 supplied with gas through the communication holes 52. When the internal pressure of the lower bag section 44 rises to a predetermined value or above due to the inside of the lower bag section 44 being supplied with gas, the check valve 28A is squashed (operates) due to the internal pressure of the lower bag section 44. The flow of gas between the inside of the lower bag section 44 and the inside of the rear bag section 42 is thereby blocked or restricted.

After operation of the check valve 28A, the internal pressure of the lower bag section 44 temporarily rises due to load from the occupant P, while the internal pressure of the rear bag section 42 falls accompanying the rise in the internal pressure of the front bag section 40. After the internal pressure of the rear bag section 42 and the internal pressure of the front bag section 40 have equalized, the internal pressures of both the rear bag section 42 and the front bag section 40 then fall due to emission of gas from the vent holes 54. Although the internal pressure of the lower bag section 44 gradually falls after operation of the check valve 28A due to emission of gas from the vent hole 56, the internal pressure of lower bag section 44 is maintained at a higher state than the front bag section 40 and the rear bag section 42 from an initial restraint stage to a later restraint stage.

Explanation follows regarding a manufacturing method of the side airbag 20 described above. FIG. 12 is an opened out plan view illustrating a state of the side airbag 20 prior to stitching. When manufacturing the side airbag 20, the base cloth 34, the left cloth 36, the right cloth 38, the up-down partitioning cloth 28, and the pair of tethers 30, 32 are stitched at the respective stitch portions as described above. Specifically, as illustrated in FIG. 13, in a first process, the up-down partitioning cloth 28 is first superimposed on one side in a direction along the fold portion 34F of the base cloth 34 prior to being folded in two (the lower portion side of the base cloth 34). The upper edge portion of the up-down partitioning cloth 28, positioned at the other side in the direction along the fold portion 34F, is then stitched to the base cloth 34 at the upper edge stitch portion S1.

Figure 14:
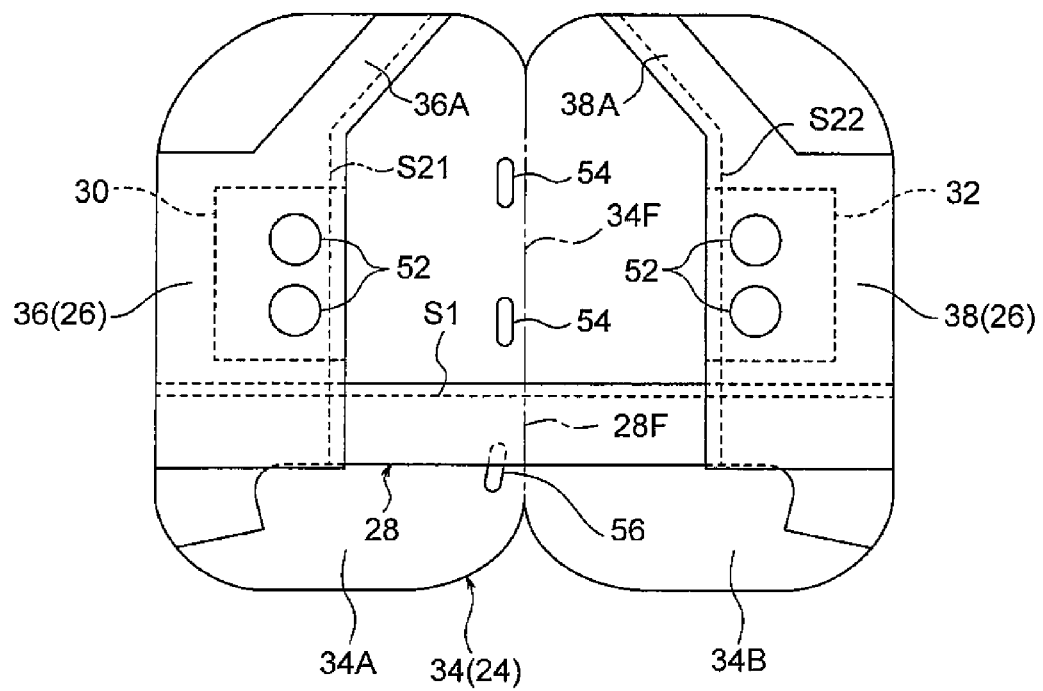
FIG. 14 is an explanatory diagram for explaining a second process in the manufacturing process.

As illustrated in FIG. 14, in a second process, the tethers 30, 32 are then superimposed on the center side of the direction along the fold portion 34F of the base cloth 34 (the up-down direction center side of the base cloth 34), at both sides in a direction orthogonal to the fold portion 34F, and the left cloth 36 and the right cloth 38 are then superimposed on both these sides. The front edge portions of the left cloth 36, the right cloth 38, and the tethers 30, 32 positioned at the fold portion 34F side are then stitched to the base cloth 34 at the front edge stitch portions S21, S22.

Note that in cases in which one out of the tethers 30, 32 is omitted, the other of the tethers 30, 32 is only superimposed on one side, rather than both the sides described above. As in the example illustrated by the solid line in FIG. 5, in cases in which the front edge portions of the tethers 30, 32 are stitched to the one side portion 34A and the other side portion 34B of the base cloth 34 at the stitch portions S81, S82 that are separate from the front edge stitch portions S21, S22, the stitching operation at the stitch portions S81, S82 is performed prior to superimposing the left cloth 36 and the right cloth 38 on both sides.

Figure 15:
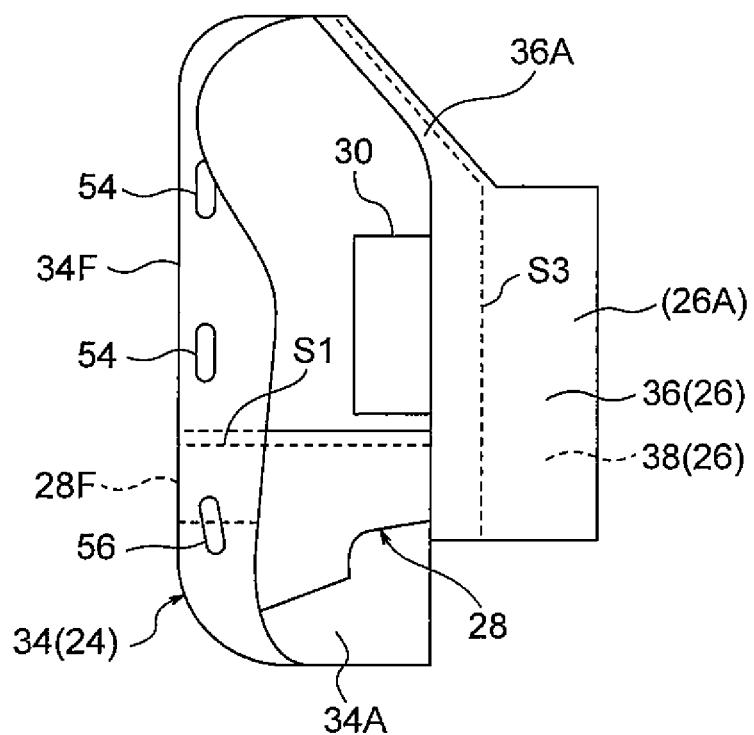
FIG. 15 is an explanatory diagram for explaining part of a third process in the manufacturing process.

As illustrated in FIG. 15, in a third process, the base cloth 34 and the up-down partitioning cloth 28 are then folded in two along the fold portion 34F, and intermediate portions of the left cloth 36 and the right cloth 38 in the direction orthogonal to the fold portion 34F are stitched together at the intermediate stitch portion S3. When this is performed, locations of the one side portion 34A and the other side portion 34B of the base cloth 34 at the opposite side to the fold portion 34F are folded back toward the fold portion 34F side together with locations of the tethers 30, 32 at the opposite side to the fold portion 34F to perform the stitching operation.

Figure 16:
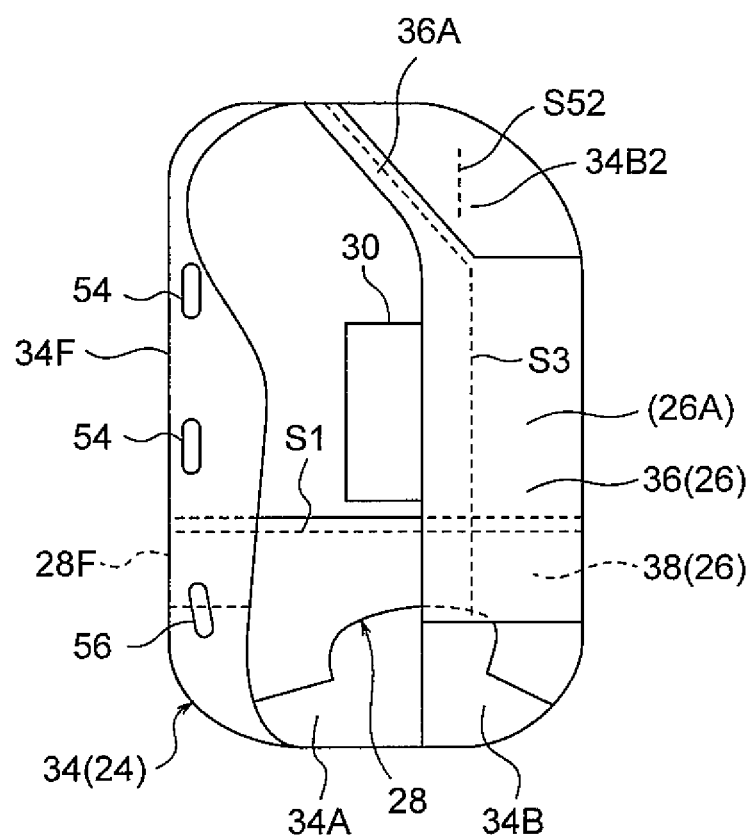
FIG. 16 is an explanatory diagram for explaining another part of the third process.
Figure 17:
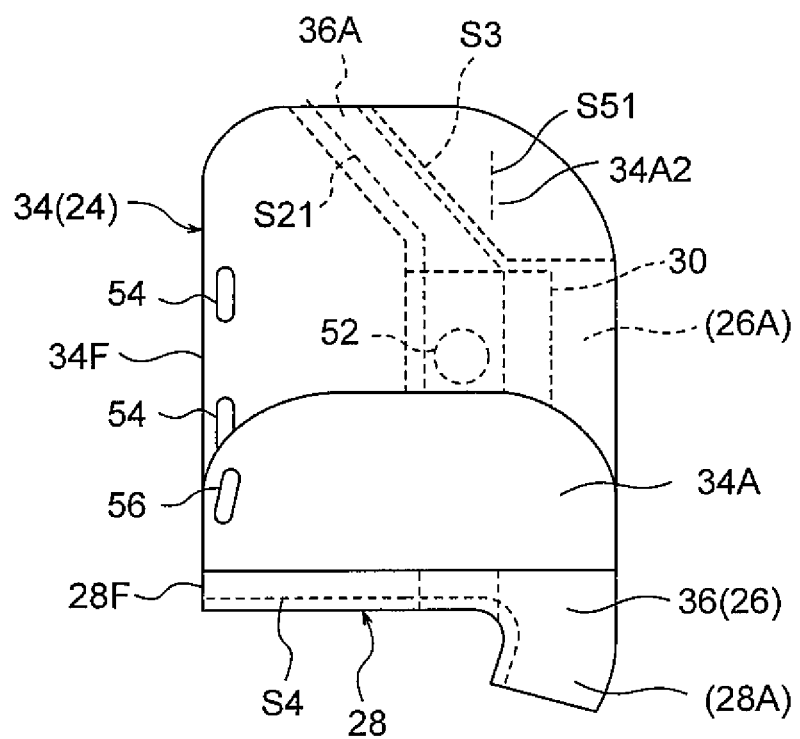
FIG. 17 is an explanatory diagram for explaining yet another part of the third process.

As illustrated in FIG. 16 and FIG. 17, also in the third process, locations of the base cloths 34A, 34B corresponding to the slack portions 34A2, 34B2 (see FIG. 10 and FIG. 11) are stitched at the slack stitch portions S51, S52. As illustrated in FIG. 17, also in the third process, the lower edge portions of the folded-over up-down partitioning cloth 28, positioned at the opposite side to the upper edge stitch portion S1, are stitched together at the lower edge stitch portion S4. When this is performed, lower portion sides of the one side portion 34A and the other side portion 34B of the base cloth 34 are folded back toward the upper portion sides to perform the stitching operation. Note that the sequence of stitching the intermediate stitch portion S3, the slack stitch portions S51, S52, and the lower edge stitch portion S4 may be changed as appropriate. The stitching operation of the slack stitch portions S51, S52 may be omitted.

In a fourth process, the rear edge portions of the tethers 30, 32 are stitched to the one side portion 34A and the other side portion 34B of the base cloth 34 at the rear edge stitch portions S61, S62. Although not illustrated in the drawings, when this is performed, the locations of the one side portion 34A and the other side portion 34B of the base cloth 34 at the opposite side to the fold portion 34F are folded back (opened out) together with the tethers 30, 32 to perform the stitching operation. Outer peripheral edge portions of the folded-over base cloth 34 are then stitched at the outer peripheral stitch portion S7, together with the upper edge portions and the rear edge portions of the left cloth 36 and the right cloth 38. The side airbag 20 is thereby complete.

Note that, when the stitching operation of the outer peripheral stitch portion S7 is performed, as illustrated in FIG. 7 or FIG. 8, the excess length portions 34A1, 34B1 occurring at the one side portion 34A and the other side portion 34B of the base cloth 34 are folded to the front side or the rear side of the bag body 24 to perform this operation. As illustrated in the example in FIG. 6, in cases in which the rear edge portions of the tethers 30, 32 are stitched together with the bag body 24 and the rear edge portions of the left cloth 36 and the right cloth 38 at the outer peripheral stitch portion S7, the rear edge portions of the tethers 30, 32 are also stitched together when stitching the outer peripheral edge portions of the folded-over base cloth 34 together with the upper edge portions and the rear edge portions of the left cloth 36 and the right cloth 38 at the outer peripheral stitch portion S7.

Explanation follows regarding operation and function of the first exemplary embodiment.

In the side airbag device 10 with the above configuration, the inflator 22 is operated by the side collision ECU 62 and gas is ejected from the inflator 22 in a case in which the side collision ECU 62 detects a side-on collision based on a signal from the side collision sensor 64. Gas ejected from the inflator 22 is supplied into the rear bag section 42 through the upper end opening 50 of the flow regulating portion 26A, and supplied into the lower bag section 44 through the lower end opening 51 of the flow regulating portion 26A and the check valve 28A. Some of the gas supplied into the rear bag section 42 is supplied into the front bag section 40 through the communication holes 52. The bag body 24 provided with the respective bag sections 40, 42, 44 thereby inflates and deploys toward the vehicle front side of the side support section 16A of the seatback 16. The rear bag section 42 and the lower bag section 44 inflate and deploy at an earlier stage and a higher pressure than the front bag section 40 when this occurs.

The rear bag section 42 is partitioned into the left and right chambers 46, 48 by the front-rear left-right partitioning cloth 26, and the left and right chambers 46, 48 are in a row along the vehicle width direction in the inflated and deployed state of the bag body 24. Accordingly, the inflation thickness L1 of the rear bag section 42 in the vehicle front-rear direction can be set smaller than the inflation thickness W1 of the rear bag section 42 in the vehicle width direction. As a result, the projection amount of the left and right chambers 46, 48 from the side support section 16A toward the vehicle front side may be reduced, while initial restraint performance of the occupant P by the rear bag section 42 may be improved. Thus, even in a case in which an occupant is positioned in an unsuitable position (out of position) at the front of the side support section 16A, the left and right chambers 46, 48, namely, the higher pressure rear bag section 42, may be suppressed or prevented from affecting the occupant.

In the present exemplary embodiment, in the inflated and deployed state of the bag body 24, the tethers 30, 32 provided to the left and right chambers 46, 48 bear tension, and restrict inflation of the left and right chambers 46, 48 toward the vehicle front side. Accordingly, the present exemplary embodiment may adjust the projection amount of the left and right chambers 46, 48 from the side support section toward the vehicle front side. Thus, the present exemplary embodiment may suppress or prevent the rear bag section 42 with high pressure from affecting the occupant P in an unsuitable position.

Figure 18:
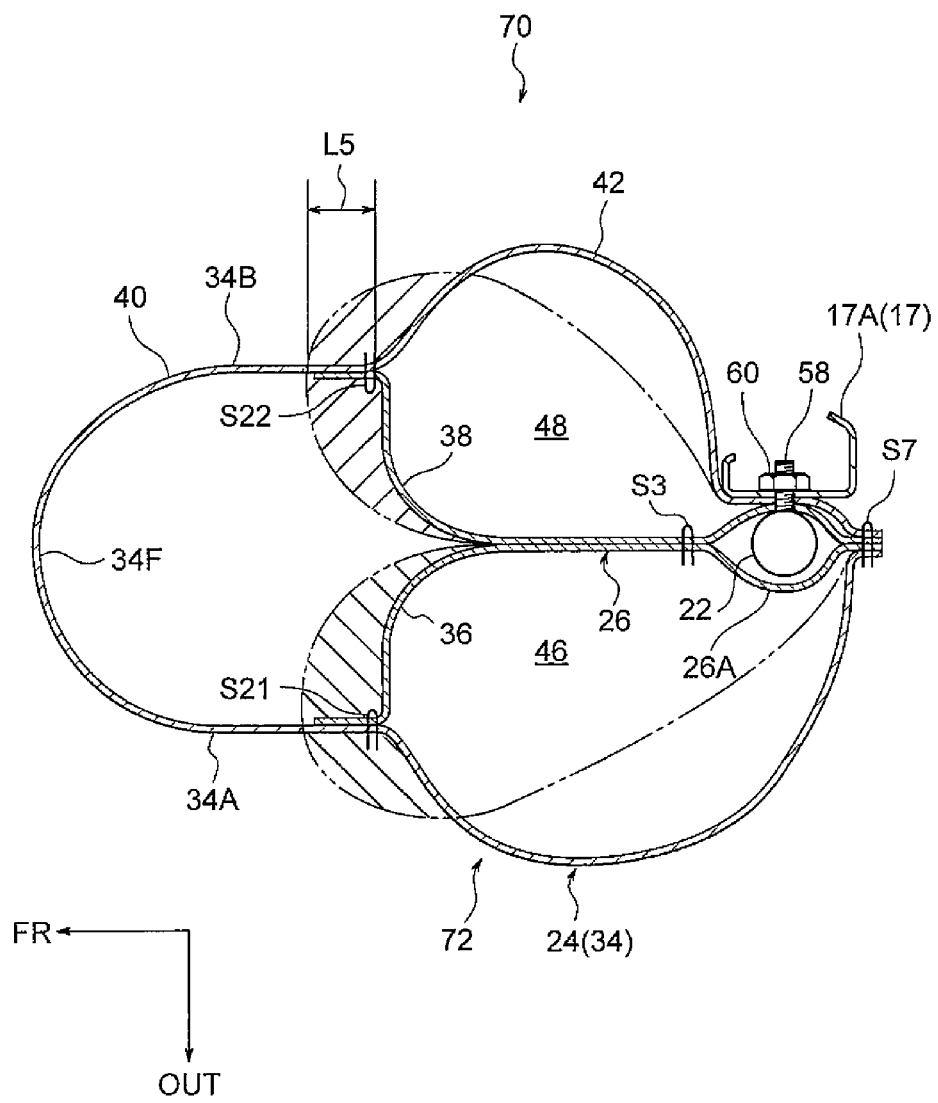
FIG. 18 is a cross-sectional view corresponding to FIG. 3, illustrating an inflated and deployed state of a side airbag according to a comparative example.

Explanation follows regarding the above function, using a comparative example 70 illustrated in FIG. 18. In the comparative example 70, a side airbag 72 is configured without the tethers 30, 32. However, other configuration is similar to the present exemplary embodiment. In the comparative example 70, when the peripheral length of the left and right chambers 46, 48 is set longer in order to improve occupant restraint performance by the rear bag section 42 at an initial stage, it becomes difficult to restrict (regulate) inflation of the left and right chambers 46, 48 toward the vehicle front side using the front-rear left-right partitioning cloth 26 provided at the width direction center side of the rear bag section 42 alone. As a result, there may be a case in which the left and right chambers 46, 48 inflate and deploy as illustrated by the double-dotted dashed lines in FIG. 18, and in which the projection amount of the left and right chambers 46, 48 from the side support section 16A toward the vehicle front side increases (see the arrow L5 in FIG. 18), whereas the present exemplary embodiment may avoid such case.

In the present exemplary embodiment, the front-rear left-right partitioning cloth 26 includes the left cloth 36 and the right cloth 38 in a row in the vehicle width direction in the inflated and deployed state of the bag body 24, and the rear bag section 42 is partitioned into the left and right chambers 46, 48 by the left cloth 36 and the right cloth 38. Accordingly, in a case in which the left and right chambers 46, 48 that have inflated and deployed impinge from the vehicle rear side on an occupant in an unsuitable position, the effect on the occupant may be reduced by the left and right chambers 46, 48 escaping in separate directions from each other (the vehicle width direction).

In the present exemplary embodiment, the front edge portions of the tethers 30, 32 are stitched to the front portions of the left and right chambers 46, 48, and the rear edge portions of the tethers 30, 32 are stitched to the rear portions of the left and right chambers 46, 48. Accordingly, the present exemplary embodiment may simply adjust the inflation thicknesses of the left and right chambers 46, 48 in the vehicle front-rear direction and the vehicle width direction, by changing the stitching positions of the front edge portions of the tethers 30, 32 with respect to the front portions of the left and right chambers 46, 48, and the stitching positions of the rear edge portions of the tethers 30, 32 with respect to the rear portions of the left and right chambers 46, 48.

In the present exemplary embodiment, the outer peripheral edge portions of the base cloth 34 of the bag body 24, which has been folded in two along the fold portion 34F positioned at the front edge portion of the bag body 24, are stitched at the outer peripheral stitch portion S7. Further, the rear edge portions of the left cloth 36 and the right cloth 38 are stitched together with the rear edge portion of the bag body 24 at the outer peripheral stitch portion S7. Therefore, in the present exemplary embodiment, the rear edge portions of the left cloth 36 and the right cloth 38 may he stitched together with the rear edge portion of the bag body 24 at the outer peripheral stitch portion S7 during the stitching operation of the outer peripheral stitch portion S7. Accordingly, the present exemplary embodiment may reduce the number of stitching processes. Moreover, since there is no need to stitch the fold portion 34F of the base cloth 34 at the outer peripheral stitch portion S7, the present exemplary embodiment may reduce the stitch length. Thus, the present exemplary embodiment may reduce the cost of stitching.

In the present exemplary embodiment, the bag body 24 includes the up-down partitioning cloth 28 that partitions the front bag section 40 and the rear bag section 42 from the lower bag section 44. Therefore, the present exemplary embodiment may individually adjust the internal pressures of the respective bag sections 40, 42, 44 according to the load resistance at each portion of the occupant P, when the front portions of the chest region C and abdominal region B of the occupant P are restrained by the front bag, section 40, the shoulder region S and the rear portions of the chest region C and abdominal region B of the occupant P are restrained by the rear bag section 42, and the lumbar region L of the occupant P is restrained by the lower bag section 44. Accordingly, the present exemplary embodiment may improve occupant restraint performance by the side airbag 20.

In the present exemplary embodiment, the side airbag 20 with the tethers 30, 32 provided to the left and right chambers 46, 48 may be easily manufactured by performing the first to fourth processes previously described. Accordingly, the present exemplary embodiment may reduce the cost of manufacturing the side airbag 20 and may perform the above described functions.

Explanation follows regarding another exemplary embodiment of the present disclosure. Note that configuration and operation that are basically the same as the first exemplary embodiment are appended with the same reference numerals, and explanation thereof is omitted.

Second Exemplary Embodiment

Figure 19:
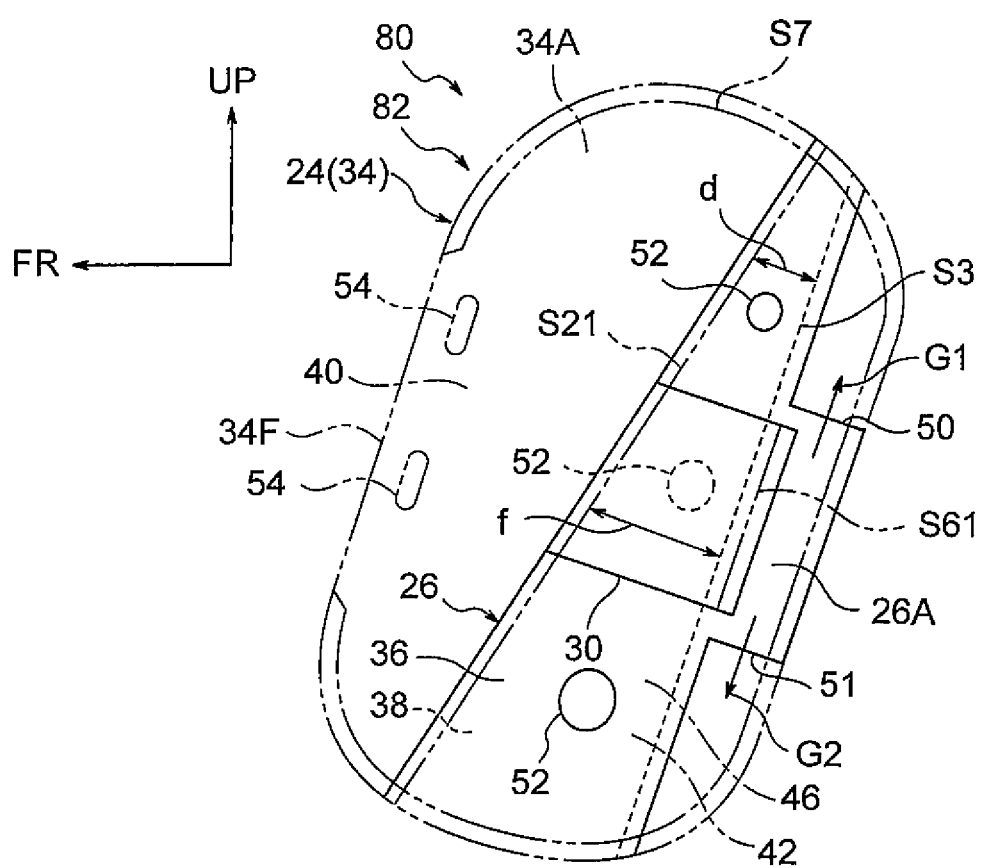
FIG. 19 is a side view corresponding to FIG. 2, illustrating an inflated and deployed state of a side airbag provided to a vehicle side airbag device according to a second exemplary embodiment.
Figure 20:
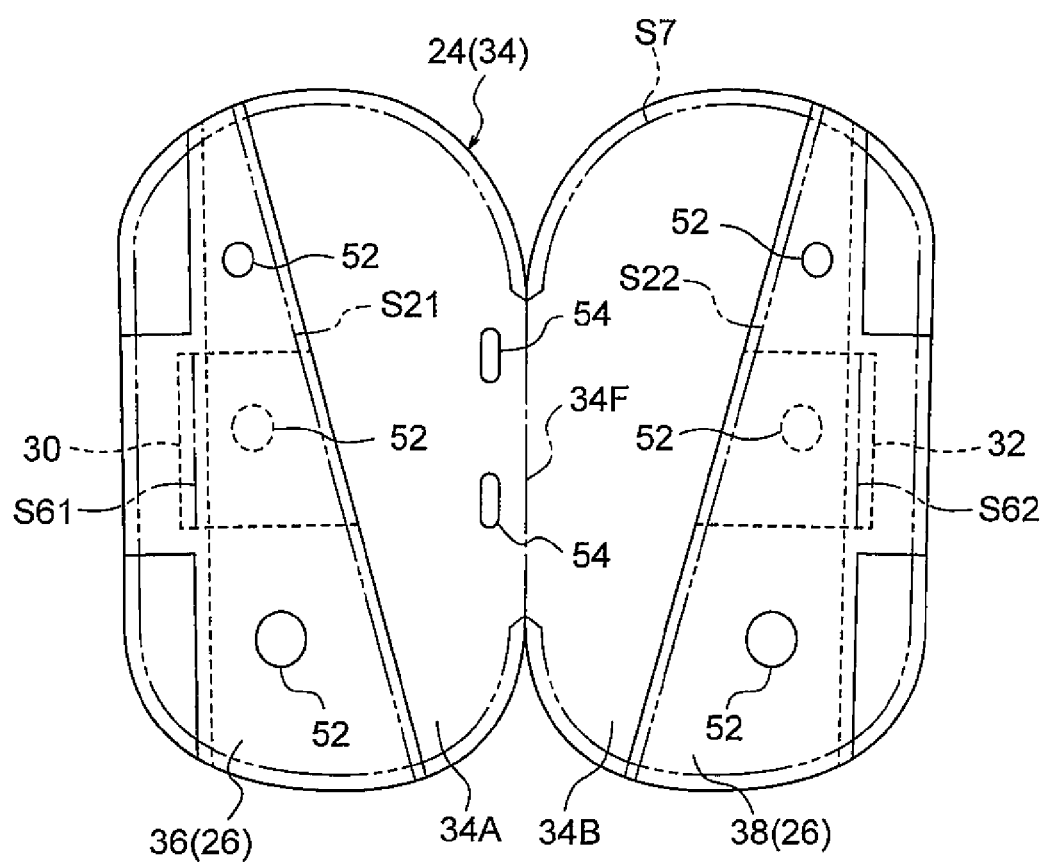
FIG. 20 is an opened out plan view illustrating a state prior to stitching the side airbag illustrated in FIG. 19.

FIG. 19 is a side view corresponding to FIG. 2, illustrating an inflated and deployed state of a side airbag 82 provided to a vehicle side airbag device 80 according to a second exemplary embodiment of the present disclosure. FIG. 20 is an opened out plan view illustrating a state prior to stitching the side airbag 82 illustrated in FIG. 19.

In the side airbag 82, the up-down partitioning cloth 28 and the lower bag section 44 according to the first exemplary embodiment are omitted. In the side airbag 82, the front-rear left-right partitioning cloth 26 extends as far as the lower edge portion of the bag body 24, and a lower edge portion of the from-rear left-right partitioning cloth 26 is stitched to the lower edge portion of the base cloth 34 at the outer peripheral stitch portion S7. The left cloth 36 and the right cloth 38 of the front-rear left-right partitioning cloth 26 are formed with width dimensions that increase on progression from the upper edge portion side to the lower edge portion side of the bag body 24. Other configuration of the side airbag 82 is similar to the side airbag 20 according to the first exemplary embodiment.

When manufacturing the side airbag 82, the base cloth 34, the left cloth 36, the right cloth 38, and the pair of tethers 30, 32 illustrated in FIG. 20 are stitched at the front edge stitch portions S21, S22, the intermediate stitch portion 83, the rear edge stitch portions S61, S62, and the outer peripheral stitch portion S7. Specifically, in a first process, the tethers 30, 32 are first superimposed on both sides in the direction orthogonal to the told portion 34F of the base cloth 34 prior to being folded in two, and the left cloth 36 and the right cloth 38 are then superimposed on both these sides. The front edge portions of the left cloth 36, the right cloth 38, and the tethers 30, 32 positioned at the fold portion 34F side are then stitched to the base cloth 34 at the front edge stitch portions S21, S22.

Note that in cases in which one of the tethers 30, 32 is omitted, and in cases in which the front edge portions of the tethers 30, 32 are stitched to the one side portion 34A and the other side portion 34B of the base cloth 34 at the stitch portions S81, S82 that are separate from the front edge stitch portions S21, S22, explanation is similar to the second process in the first exemplary embodiment.

In a second process, the base cloth 34 is then folded in two along the fold portion 34F, and the intermediate portions of the left cloth 36 and the right cloth 38 in the direction orthogonal to the fold portion 34F are stitched together at the intermediate stitch portion S3 parallel to the front edge stitch portions S21, S22.

In a third process, the rear edge portions of the tethers 30, 32 are then stitched to the one side portion 34A and the other side portion 34B of the base cloth 34 at the rear edge stitch portions S61, S62. The outer peripheral edge portions of the folded-over base cloth 34 are then stitched together at the outer peripheral stitch portion S7, together with the upper edge portions and the rear edge portions of the left cloth 36 and the right cloth 38. Thus, the side airbag 82 of the present exemplary embodiment is thereby complete. Note that, in a case in which the rear edge stitch portions S61, S62 are omitted, the rear edge portions of the tethers 30, 32 are stitched together when the outer peripheral edge portions of the folded-over base cloth 34 are stitched together with the upper edge portions and the rear edge portions of the left cloth 36 and the right cloth 38 at the outer peripheral stitch portion S7.

The present exemplary embodiment enables basically the same operation and function as obtained in the first exemplary embodiment, except for the function obtained by providing a lower bag section 44 at the side airbag 82. Further, in the present exemplary embodiment, since the configuration of the side airbag 82 is simpler than that of the side airbag 20 according to the first exemplary embodiment, the cost may be further reduced.

Additional Explanation of Exemplary Embodiments

In each of the above exemplary embodiments, a case in which the bag body 24, the front-rear left-right partitioning cloth 26, and the up-down partitioning cloth 28 were configured to be made of cloth, have been described. However the present disclosure is not limited thereto. A bag body, a front-rear left-right partitioning cloth, and an up-down partitioning cloth may be formed of any material in cloth form (a flexible material in sheet form).

To each of the above exemplary embodiments, a case in which the tethers 30, 32 are formed of a cloth material that is a separate body to the base cloth 34 of the bag body 24 and the front-rear left-right partitioning cloth 26, have been described. However, the present disclosure is not limited thereto. Namely, a base cloth of a bag body, or a front-rear left-right partitioning cloth, may be partially extended, and a tether may be configured by the extended portion.

In each of the above exemplary embodiments, a case in which the front-rear left-right partitioning cloth 26 is configured including the left cloth 36 and the right cloth 38, have been described. However, the present disclosure is not limited thereto. Namely, a front-rear partitioning cloth may be configured including a front-rear partitioning cloth that partitions a bag body into a front bag section and a rear bag section and a left-right partitioning cloth that partitions the rear bag section into left and right chambers. In such cases, for example, as front edge portion of the left-right partitioning cloth is stitched to a width direction intermediate portion (left-right direction intermediate portion) of the from-rear partitioning cloth, and a rear edge portion of the left-right partitioning, cloth is stitched to a rear edge portion of the bag body.

Various other modifications may be implemented within a range not departing from the spirit of the present disclosure. Obviously the scope of rights of the present disclosure is not restricted by any of the above exemplary embodiments.

What is claimed is:

1. A vehicle side airbag device comprising:
   a side airbag, housed inside a side support section of a seatback of a vehicle seat, that inflates and deploys toward a vehicle front side of the side support section upon being supplied with gas from an inflator, the side airbag including:
   a bag body that is formed in a bag shape;
   a front-rear left-right partitioning cloth that partitions the bag body into a front bag section and a rear bag section, and that partitions the rear bag section into a left chamber and a right chamber in a row along a vehicle width direction in an inflated and deployed state of the bag body; and a tether, provided at at least one chamber of the left chamber or the right chamber, that bears tension in the inflated and deployed state, and that restricts inflation of the at least one chamber toward the vehicle front side.

2. The vehicle side airbag device of claim 1, wherein the front-rear left-right partitioning cloth includes a left cloth and a right cloth in a row in the vehicle width direction in the inflated and deployed state.

3. The vehicle side airbag device of claim 1, wherein:
a front edge portion of the tether is stitched to a front portion of the at least one chamber; and
a rear edge portion of the tether is stitched to a rear portion of the at least one chamber.

4. The vehicle side airbag device of claim 1, wherein:
in the bag body, outer peripheral edge portions of a base cloth folded in two along a fold portion positioned at a front edge portion of the bag body are stitched together at an outer peripheral stitch portion; and
a rear edge portion of the front-rear left-right partitioning cloth is stitched together with a rear edge portion of the bag body at the outer peripheral stitch portion.

5. The vehicle side airbag device of claim 1, further comprising an up-down partitioning cloth that partitions the bag body into the front bag section and the rear bag section, and a lower bag section.

6. The vehicle side airbag device of claim 4, further comprising an up-down partitioning cloth that partitions the bag body into the front bag section and the rear bag section, and a lower bag section.

7. The vehicle side airbag device of claim 2, wherein communication holes are formed at both the left cloth and the right cloth, the communication holes placing the tell chamber and the right chamber in communication with the front bag section.

8. The vehicle side airbag device of claim 4, wherein:
a front edge portion of the tether is stitched to a front-rear direction intermediate portion of the base cloth, and to a front edge portion of a left cloth or a right cloth that configure the front-rear left-right partitioning cloth, at a front edge stitch portion; and
a rear edge portion of the tether is stitched to a rear portion of the base cloth at a rear edge stitch portion.

9. The vehicle side airbag device of claim 4, wherein a front edge portion of the tether is stitched to the base cloth at a stitch portion that is set further to a rear edge side of the hag body than a front edge stitch portion.

10. The vehicle side airbag device of claim 4, wherein a rear edge portion of the tether is stitched to the bag body and to rear edge portions of a left cloth and a right cloth, which configure the front-rear left-right partitioning cloth, at the outer peripheral stitch portion.

11. The vehicle side airbag device of claim 1, wherein a peripheral length of a region of the bag body that configures the rear bag section is set to be longer than a length dimension of a region of the tether that is positioned inside the left chamber and the right chamber.

12. The vehicle side airbag device of claim 5, wherein slack stitch portions are respectively provided at an upper portion of the rear bag section and at the lower bag section.

13. The vehicle side airbag device of claim 1, wherein:
the front-rear left-right partitioning cloth extends as far as a lower edge portion of the bag body;
a lower edge portion of the front-rear left-right partitioning cloth is stitched to the lower edge portion of the bag, body at an outer peripheral stitch portion; and
the front-rear left-right partitioning cloth is formed with a width dimension that increases on progression from an upper edge portion side to a lower edge portion side of the bag body.

14. A manufacturing method of a side airbag provided at the vehicle side airbag device according to claim 4, the side airbag manufacturing method comprising:
superimposing one or two of the tethers on one or both sides in a direction orthogonal to the fold portion of the base cloth prior to being folded in two, superimposing a left cloth and a right cloth provided at the front-rear left-right partitioning cloth on both the sides of the base cloth, and stitching front edge portions positioned at the fold portion side of the left cloth and the right cloth, and of the one or two tethers, to the base cloth at front edge stitch portions;
folding the base cloth in two along the fold portion, and stitching intermediate portions in a direction orthogonal to the fold portion of the left cloth and the right cloth together at an intermediate stitch portion running parallel to the front edge stitch portions; and
stitching a rear edge portion of the one or two tethers to the base cloth at a rear edge stitch portion and stitching outer peripheral edge portions of the base cloth that has been folded in two to upper edge portions, rear edge portions, and lower edge portions of the left cloth and the right cloth at the outer peripheral stitch portion, or, stitching together the rear edge portion of the one or two tethers while stitching the outer peripheral edge portions of the base cloth that has been folded in two to the upper edge portions, the rear edge portions, and the lower edge portions of the left cloth and die right cloth at the outer peripheral stitch portion.

15. A manufacturing method of a side airbag provided at the vehicle side airbag device according to claim 6, the side airbag manufacturing method comprising:
superimposing the up-down partitioning cloth at one side in a direction along the fold portion of the base cloth prior to being folded in two, and stitching an upper edge portion of the up-down partitioning cloth positioned at the other side in the direction along the fold portion to the base cloth at an upper edge stitch portion;
superimposing one or two of the tethers on a center side in the direction along the fold portion, and on one or both sides in a direction orthogonal to the fold portion of the base cloth, superimposing a left cloth and a right cloth provided at the front-rear left-right partitioning cloth on both the sides of the base cloth, and stitching front edge portions positioned at the fold portion side of the left cloth and the right cloth, and of the one or two tethers, to the base cloth at front edge stitch portions
folding the base cloth and the up-down partitioning cloth in two along the fold portion, and stitching intermediate portions in a direction orthogonal to the told portion of the left cloth and the right cloth together at an intermediate stitch portion running parallel to the front edge stitch portions and stitching together lower edge portions positioned at an opposite side from the upper edge stitch portion of the up-down partitioning cloth folded in two at a lower edge stitch portion; and
stitching a rear edge portion of the one or two tethers to the base cloth at a rear edge stitch portion and stitching outer peripheral edge portions of the base cloth that has been folded in two to upper edge portions and rear edge portions of the left cloth and the right cloth and at the outer peripheral stitch portion, or, stitching together the rear edge portion of the one or two tethers while stitching the outer peripheral edge portions of the base cloth that has been folded in two to the upper edge portions and the rear edge portions of the left cloth and the right cloth and at an outer peripheral stitch portion.

* * * * *